(12) United States Patent
Saigusa

(10) Patent No.: US 11,789,676 B2
(45) Date of Patent: Oct. 17, 2023

(54) INFORMATION APPARATUS, CONTROLLING METHOD FOR INFORMATION APPARATUS, AND STORAGE MEDIUM

(71) Applicant: CANON KABUSHIKI KAISHA, Tokyo (JP)

(72) Inventor: Hirokazu Saigusa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/937,748

(22) Filed: Oct. 3, 2022

(65) Prior Publication Data

US 2023/0026187 A1    Jan. 26, 2023

Related U.S. Application Data

(63) Continuation of application No. 16/453,829, filed on Jun. 26, 2019, now Pat. No. 11,487,483.

(30) Foreign Application Priority Data

Jun. 29, 2018 (JP) ................................. 2018-123999

(51) Int. Cl.
*G06F 3/12* (2006.01)
*G06F 8/61* (2018.01)

(52) U.S. Cl.
CPC .......... *G06F 3/1225* (2013.01); *G06F 3/1205* (2013.01); *G06F 3/1228* (2013.01); *G06F 3/1231* (2013.01); *G06F 3/1232* (2013.01); *G06F 8/61* (2013.01)

(58) Field of Classification Search
CPC .... G06F 3/1225; G06F 3/1205; G06F 3/1228; G06F 3/1231; G06F 3/1232; G06F 8/61
See application file for complete search history.

(56) References Cited

U.S. PATENT DOCUMENTS

| | | | | |
|---|---|---|---|---|
| 2012/0140285 A1* | 6/2012 | Kamath | ................ | G06F 3/1204 358/1.15 |
| 2015/0169267 A1* | 6/2015 | Hirakawa | ............. | G06F 3/1206 358/1.13 |
| 2016/0094727 A1* | 3/2016 | Sawada | ............. | H04N 1/00127 358/1.15 |
| 2019/0007575 A1* | 1/2019 | Hirakata | ............ | H04N 1/00464 |

FOREIGN PATENT DOCUMENTS

JP    2015-135658 A    7/2015

* cited by examiner

Primary Examiner — Iriana Cruz
(74) Attorney, Agent, or Firm — CANON U.S.A., INC. IP Division

(57) ABSTRACT

An information apparatus comprises a controller including a processor and a memory, and the controller is configured to: obtain information of a printer; search, using the obtained information, for extension software for extending functions of a printer driver that generates a print command to be sent to the printer; install extension software found by the searching; and activate the installed extension software so that print options to be used for the printer driver to generate a print job to be sent to the printer are displayed.

23 Claims, 19 Drawing Sheets

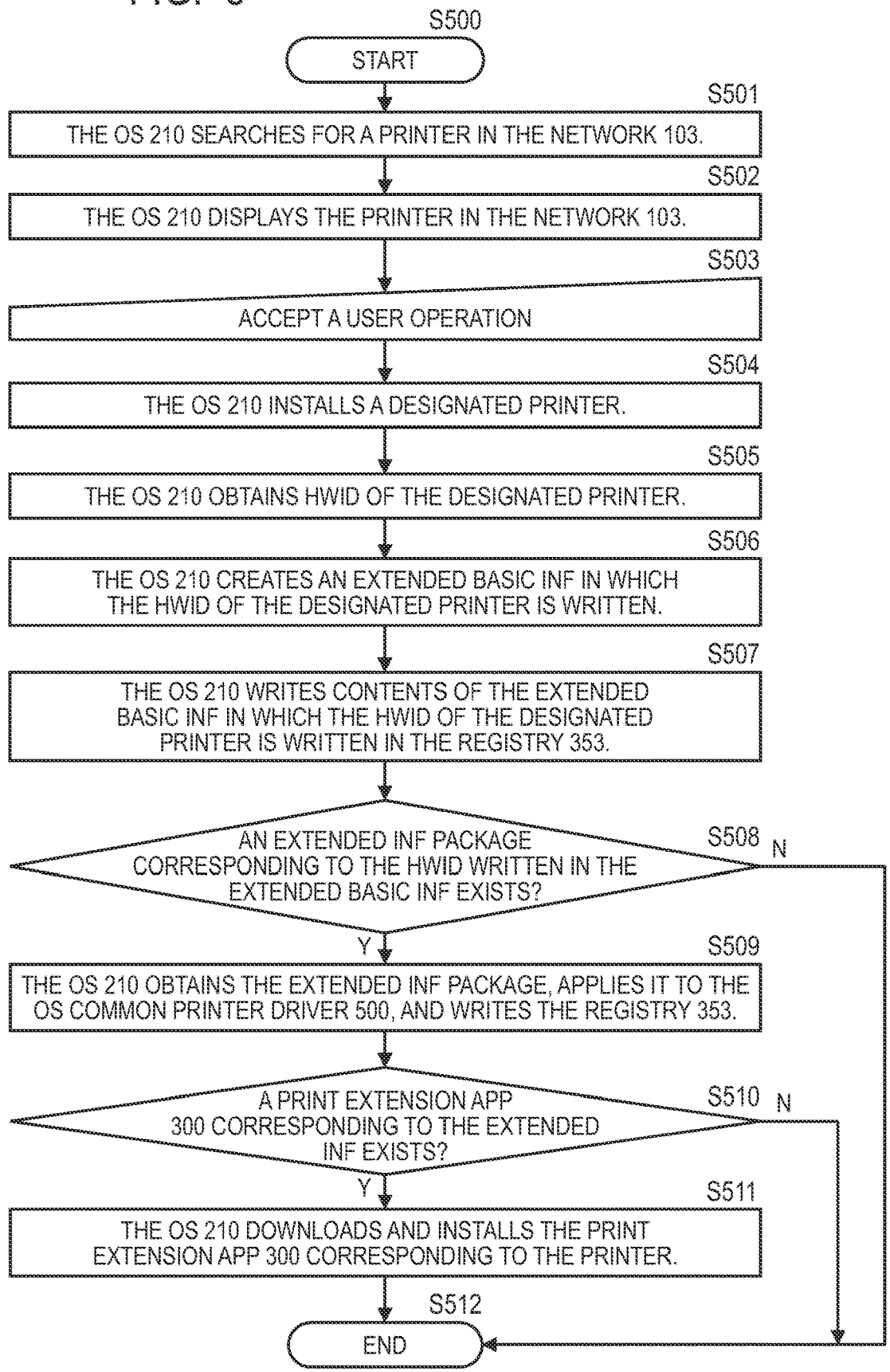

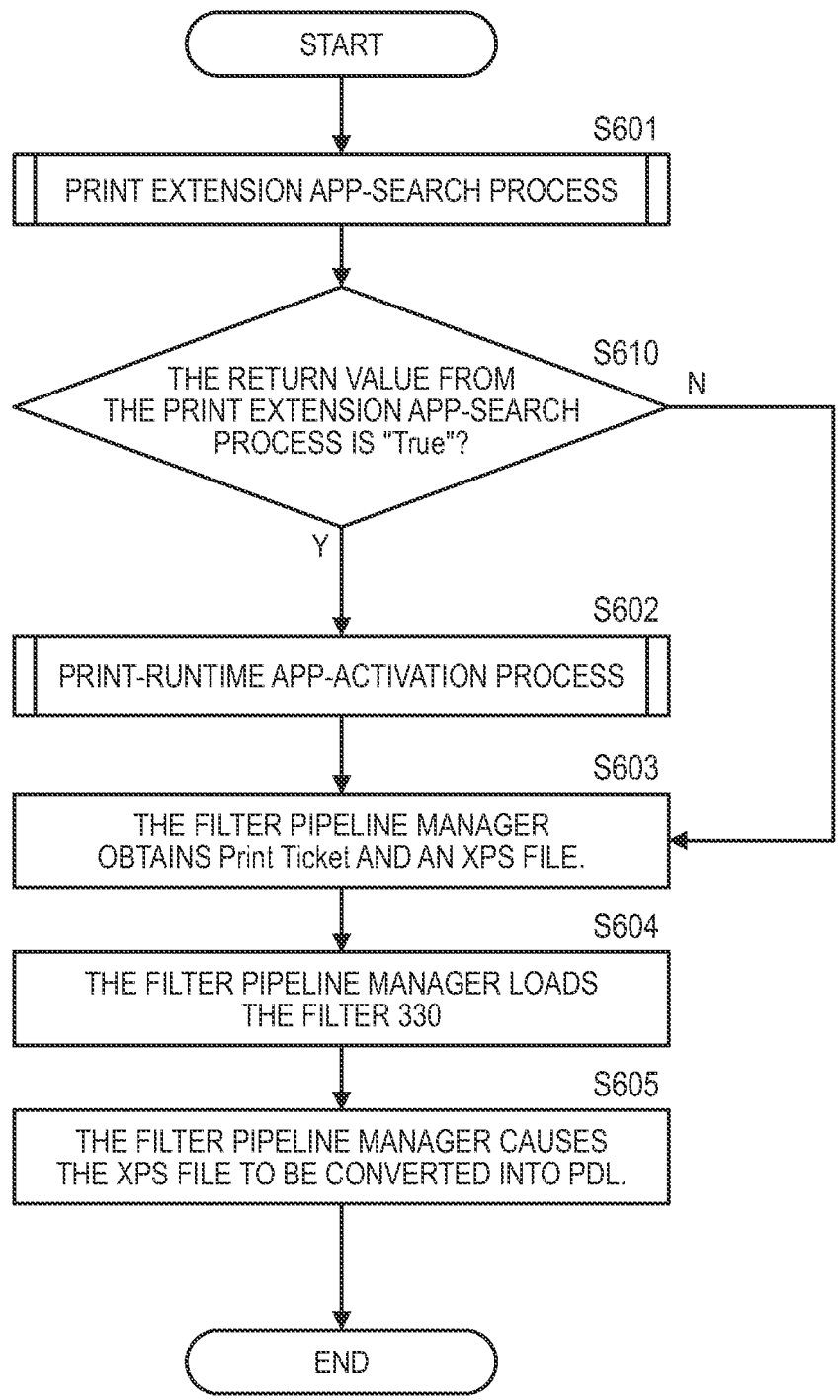

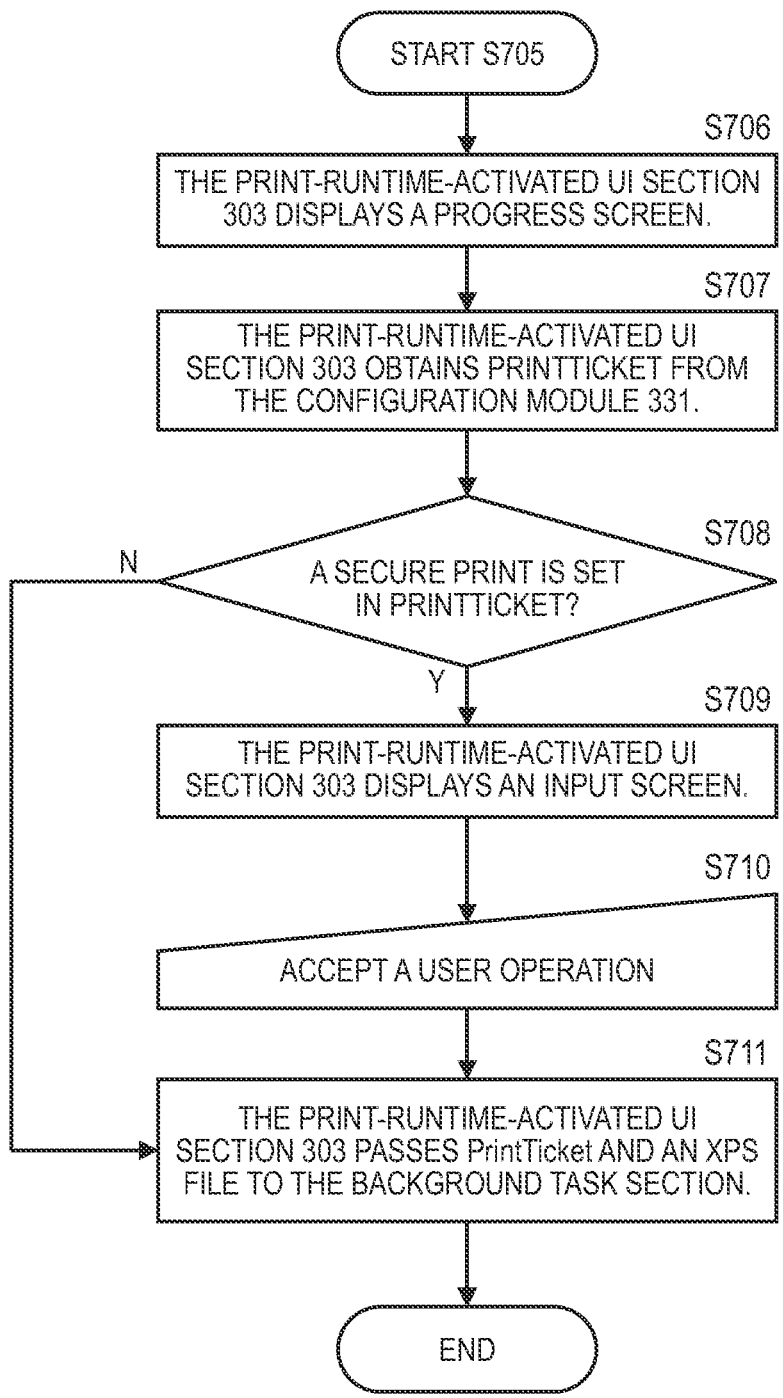

FIG. 10

```
<pSf:PrintTicket xmlnS:pSf="http://2003/08/printing/printSchemaframework"
xmlnS:xSi="http://www.w3.org/2001/XMLSchema-inStance"
xmlnS:xSd="http://www.w3.org/2001/XMLSchema"
verSion="1"
xmlnS:nS0000="http://www.canon.com/nS/printSchema/oip/v200"
xmlnS:pSk="http://SchemaS.microSoft.com/windowS/2003/08/printing/printSchemakeywordS"
xmlnS:pSkv11="http://SchemaS.microSoft.com/windowS/2013/05/printing/printSchemakeywordSv11">
  ...                                         1001
    <pSf:Feature name="nS0000:JobSecurePrint">
      <pSfOption name="nS0000:SecurePrint" />
    </pSf:Feature>          1002
    <pSf:ParameterInit name="nS0000:JobSecurePrintPaSSword">
      <pSf:Value xSi:type="xSd:String">XXXXXX</pSf:Value>
    </pSf:ParameterInit>
  ...
</pSf:PrintTicket>
```

FIG. 11

```xml
<?xml verSion="1.0" encoding="UTF-8"?>
<pSf:PrintCapabilitieS>
  <pSf:Feature name="nS0000:JobSecurePrint">
    <pSf:Property name="pSf:SelectionType">
      <pSf:Value xSi:type="xSd:QName">pSk:PickOne</pSf:Value>
    </pSf:Property>
    <pSf:Property name="pSk:DiSplayName">
      <pSf:Value xSi:type="xSd:String">AUTHENTICATION PRINT</pSf:Value>
    </pSf:Property>
    <pSf:Option name="nS0000:None" conStrained="pSk:None">
      <pSf:Property name="pSk:DiSplayName">
        <pSf:Value xSi:type="xSd:String">OFF</pSf:Value>
      </pSf:Property>
    </pSf:Option>
    <pSf:Option name="nS0000:SecurePrint" conStrained="pSk:None">
      <pSf:Property name="pSk:DiSplayName">
        <pSf:Value xSi:type="xSd:String">ON</pSf:Value>
      </pSf:Property>
    </pSf:Option>
  </pSf:Feature>
```

| CUE NAME | HWID | AppId | POLICY | InterfaceID | CUSTOM SETTING FILE IDENTIFIER | DRIVER | PORT |
|---|---|---|---|---|---|---|---|
| MFP501 | AAA | AAA01 | ON | InterfaceAAA | BBB01 | DRIVER STORING AREA 5001 | XXX |
| MFP502 | CCC | CCC01 | OFF | InterfaceCCC | DDD01 | DRIVER STORING AREA 5002 | YYY |

1201 1202 1203 1204 1205 1206 1207 1208

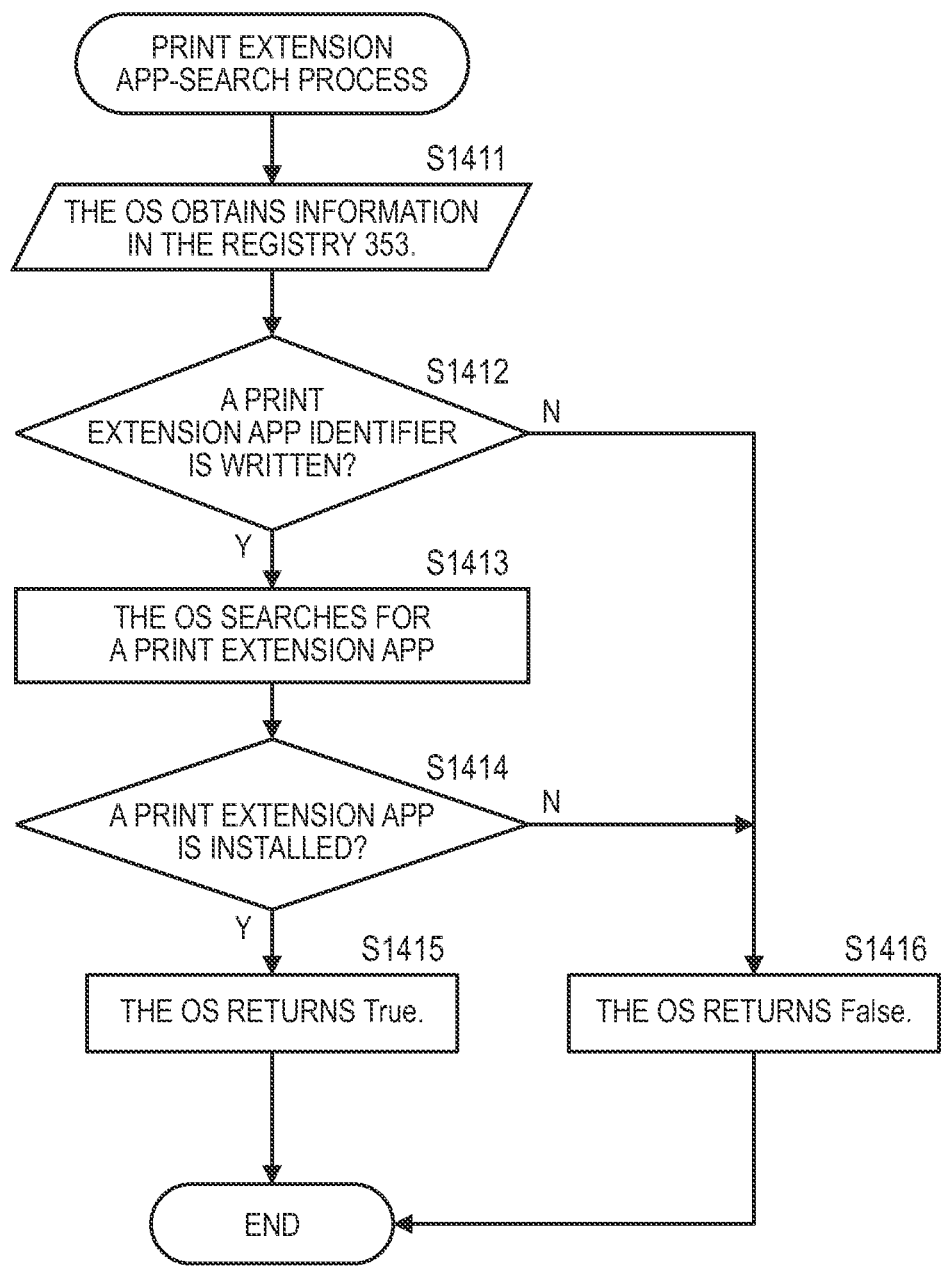

FIG. 16

| CUE NAME | HWID | AppId | POLICY | InterfaceID | CUSTOM SETTING FILE IDENTIFIER | DRIVER | PORT | EXTENSION FILE SAVE LOCATION |
|---|---|---|---|---|---|---|---|---|
| MFP501 | AAA | AAA01 | ON | InterfaceAAA | BBB01 | DRIVER STORING AREA 5001 | XXX | GUID15001 |
| MFP502 | CCC | CCC01 | OFF | InterfaceCCC | DDD01 | DRIVER STORING AREA 5001 | YYY | GUID15002 |

1201 1202 1203 1204 1205 1206 1207 1208 16001

INFORMATION APPARATUS, CONTROLLING METHOD FOR INFORMATION APPARATUS, AND STORAGE MEDIUM

CROSS-REFERENCE TO RELATED APPLICATION

This application is a Continuation of U.S. application Ser. No. 16/453,829, filed Jun. 26, 2019, which claims the benefit of Japanese Patent Application No. 2018-123999, filed Jun. 29, 2018, which is hereby incorporated by reference herein in its entirety.

BACKGROUND

Field of the Disclosure

The present disclosure relates to an information apparatus, a controlling method for the information apparatus, and a storage medium.

Description of the Related Art

There are generally known arrangements for transmitting print data to a printing apparatus by using a printer driver. A host computer includes basic software, or an operating system (OS), installed thereon. The printer driver is configured according to defined specifications for the OS and is called by the OS to operate.

Printing apparatus vendors can offer an OS specification-compatible printer driver suitable for a printing apparatus to provide a function for instructing a printer to print documents through the OS.

When Windows® 8 or earlier of Microsoft® is used as the OS, the printer driver is configured in an architecture called a V3 printer driver. The V3 printer driver can provide a function such that a UI (User Interface) is displayed upon request from a user to prompt the user to make an operation.

In Windows, another architecture called V4 printer driver has recently been introduced. Since priority is placed on security, the V4 printer driver has lower customizability for the printer driver itself than the V3 printer driver. For example, a configuration module is provided by the OS, and a printing apparatus vendor can provide only a configuration or script file for customizing the operation of the printing apparatus.

To compensate for such lowered customizability, printing apparatus vendors can offer specialized applications for supplementing functions of the printer driver. Such applications are called UWP Device Apps (Universal Windows Platform Device Apps).

For the UWP Device Apps, printing apparatus vendors provide the Hardware ID for a driver, which is called Device Stage, and metadata containing the ID of the UWP Device Apps, for each driver. In this way, the UWP Device Apps can be associated with drivers.

The UWP Device Apps can be provided with functions such as so-called Workflow (WF) and Print Preference. The WF represents a function for causing print-related processes to be executed in response to a predetermined user operation or the like as a trigger. The Print Preference represents a function for setting printer-specific print settings.

A printer driver called "universal printer driver" for controlling plural types of printing apparatuses having different functions is known (for example, see Japanese Patent Application Laid-Open No. 2015-135658). The printer driver enables each of printing apparatuses of the same type or model to display a suitable operation screen.

Further, there are plans to provide an ability to transmit print data to a printing apparatus without the use of any printer driver offered by printing apparatus vendors. For example, Ubuntu® 17.04 is provided with a feature for transmitting print data to a printing apparatus that supports IPP Everyware®. The IPP Everyware is a series of standards for providing an ability to use printing apparatuses from vendors or brands that offer various printing apparatuses for printing, and the industry organizations or the like are developing and promoting the standards.

A universal printer driver as disclosed in Japanese Patent Application Laid-Open No. 2015-135658 is offered on a printing apparatus vendor basis. Accordingly, plural types of printing apparatuses having different functions sold by vendors that offer the same printing apparatuses can be accommodated by one universal printer driver.

However, it has been difficult to accommodate printing apparatuses from a plurality of vendors that offer different printing apparatuses by one universal printer driver. This is because of the fact that the vendors use their own communication schemes, PDLs (page description languages), and JDLs (job description languages) that are different from each other to communicate print data, so that it is difficult to achieve the unification. This is also because of the fact that the vendors have their own extensions on the PDL or the JDL, so that it is difficult to achieve unified operation.

In recent years, there are plans to provide common printer drivers or print clients with the use of a feature that is compatible with IPP, as typified by the IPP Everyware as described above. However, in the case of providing common printer drivers that are compatible with IPP, there arises difficulty in using a function uniquely offered by a vendor.

As described above, in the V4 printing architecture or the like, features for providing specialized applications for supplementing functions of the printer driver to compensate for the lowered customizability are known. However, in a conventional way of association, only approach that has been considered is to associate one specialized application with one printer driver. Accordingly, with conventional methods, there is an inability to make an association with a plurality of UWP Device Apps suitably for each printer.

SUMMARY

According to at least one embodiment, an information apparatus comprises a controller including a processor and a memory, and the controller is configured to: obtain information of a printer; search, using the obtained information, for extension software for extending functions of a printer driver that generates a print command to be sent to the printer; install extension software found by the searching; and activate the installed extension software so that print options to be used for the printer driver to generate a print job to be sent to the printer are displayed.

Further features of the present disclosure will become apparent from the following description of exemplary embodiments with reference to the attached drawings.

BRIEF DESCRIPTION OF THE DRAWINGS

FIG. 5 is a flow chart of a process of installing an OS common printer driver.

FIG. 6 is a flow chart of a process to be executed in response to a print event.

FIG. 7B is a flow chart of a print-runtime app-activation process (activation process for a WF function).

FIG. 10 illustrates an example of PrintTicket in which an authentication print is set.

FIG. 11 illustrates an example of capability information of a printer, or PrintCapabilities.

FIG. 12 illustrates an example of written items in a registry in a first embodiment.

FIG. 14B is a flow chart of a process of displaying an advanced print setting UI section.

FIG. 16 illustrates an example of written items in a registry in the second embodiment.

DESCRIPTION OF THE EMBODIMENTS

Embodiments of the present disclosure will now be described in detail in accordance with the accompanying drawings.

In the embodiment, a printer driver of a printer driver architecture called version 4 (V4), which is introduced in Microsoft Windows 8 or later for the operating system, will now be described. Hereinafter, the printer driver will be referred to as "V4 printer driver" or "V4 driver". In the embodiment, a printer driver commonly available to printers offered by a plurality of printer vendors (hereinafter, "OS common printer driver") will also be described. The OS common printer driver is offered as a function or the like of the OS. The OS common printer driver is also of a V4 driver type. However, the present disclosure is not limited to those described above.

First Embodiment

Figure 1:
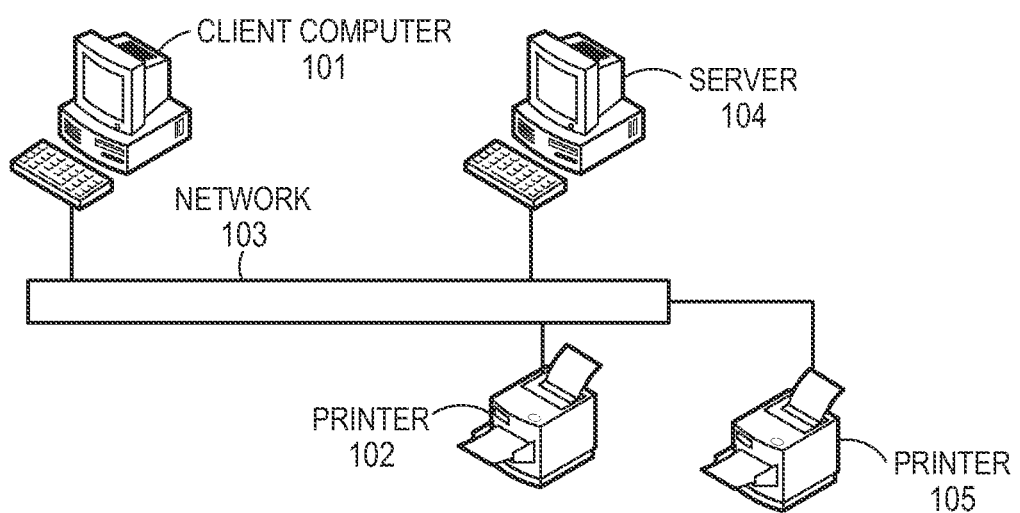
FIG. 1 illustrates an example of a printing system of an embodiment.

With reference to FIG. 1, a configuration of a printing system according to the present disclosure will be described.

FIG. 1 illustrates an example of a printing system including an information apparatus representing the first embodiment of the present disclosure. The printing system of the embodiment includes a client computer 101, a server 104, a printer 102, and a printer 105. The devices can communicate with each other through a network 103 including Wide Area Network (WAN). The network 103 may be wired or wireless.

The client computer 101 corresponds to the information apparatus of the embodiment and is made up of a personal computer (PC) or the like. The client computer 101 can transmit print data of a page description language (PDL) type to the printer 102 and the printer 105.

The server 104 can deliver data to the client computer 101.

The printer 102 is a printing apparatus (image forming apparatus) that receives the print data of a page description language type to execute printing. Similarly to the printer 102, the printer 105 receives the print data of a page description language type to execute printing. For example, the printer 102 and the printer 105 are offered by vendors different from each other.

The printer 102 and the printer 105 may be a single function printer (SFP), which only has a printing function, or a multi-function printer (MFP), which has a printing function, a scan function, and a copy function. There may be one printer or three or more printers. Further, the printer and the client computer 101 may be connected with each other by any other way than a network. For example, the printer and the client computer 101 may be connected by USB or the like.

The client computer 101 is not limited to one for the network 103, and a plurality of client computers 101 may be connected to the network 103. The client computer 101 can transmit print data to devices such as the printer 102.

Figure 2:
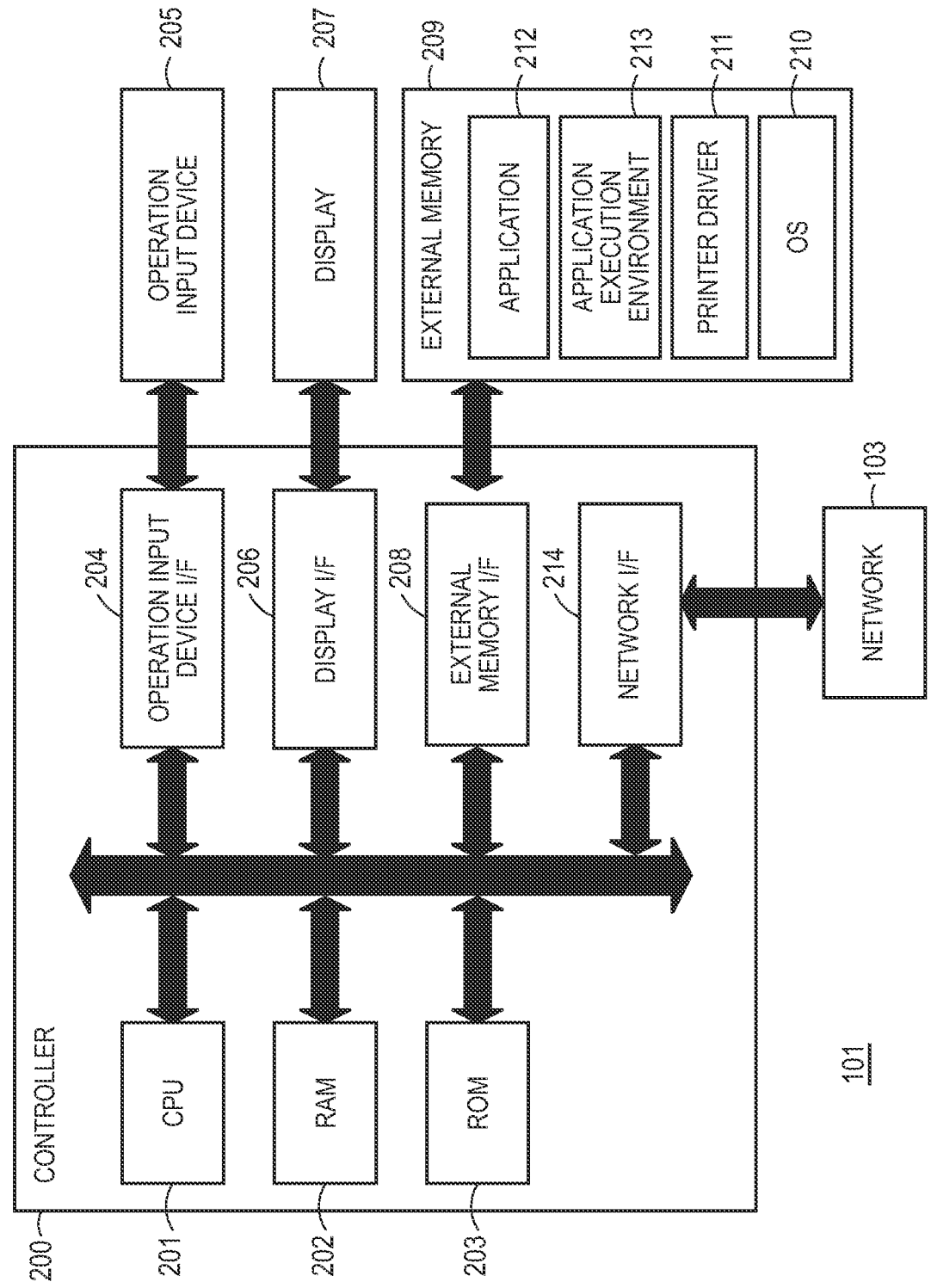
FIG. 2 is a hardware block diagram of a client computer of the embodiment.

FIG. 2 is a block diagram illustrating a hardware configuration of the client computer 101 in FIG. 1.

The client computer 101 includes a controller 200. The controller 200 includes components such as CPU (Central Processing Unit), RAM (Random Access Memory) 202, an external memory 209, and ROM (Read Only Memory) 203. The controller 200 controls the whole operation of the client computer 101.

The CPU 201 loads a program stored in the ROM 203 or the external memory 209 onto the RAM 202 and executes the program to perform various controls such as control of a UI (user interface) screen, generation of print data, and transfer of the print data. The ROM 203 stores a control program, a boot program, and other programs executable by the CPU 201. The RAM 202 is a main memory for the CPU 201 and is used as a work area or a temporary storage area for various programs to be loaded.

The external memory 209, which is connected to the controller 200 through an external memory I/F 208, stores an OS 210, an application 212, an application execution environment 213, a printer driver 211, and the like. In the embodiment, an auxiliary storage device such as an HDD (Hard Disk Drive) is assumed as the external memory 209. However, a nonvolatile memory such as an SSD (Solid State Drive) may be used instead of the HDD. As described above, hardware such as the CPU 201, the ROM 203, the RAM 202, and the external memory 209 is made up of a so-called computer.

An operation input device I/F 204 is an interface for controlling an operation input device 205 such as a keyboard, a pointing device (for example, a mouse), and a touch input device. The operation input device 205 functions as an accepting section for accepting an operation from a user.

A display I/F 206 controls display on a display 207. The display 207 functions as a display section for displaying information to a user.

The controller 200 is connected to the network 103 through a network I/F 214. The network I/F 214 provides an ability to transmit print data to a printer through the network 103 or receive a store application or a printer driver from a server 104 or the like through the network 103. Data communication with an external terminal through the network 103 is, for example, a wireless communication compatible with IEEE 802.11, a mobile communication system such as LTE and 5G, or a communication through a wired cable such as a LAN cable.

A software configuration of the client computer 101 will now be described.

Figure 3:
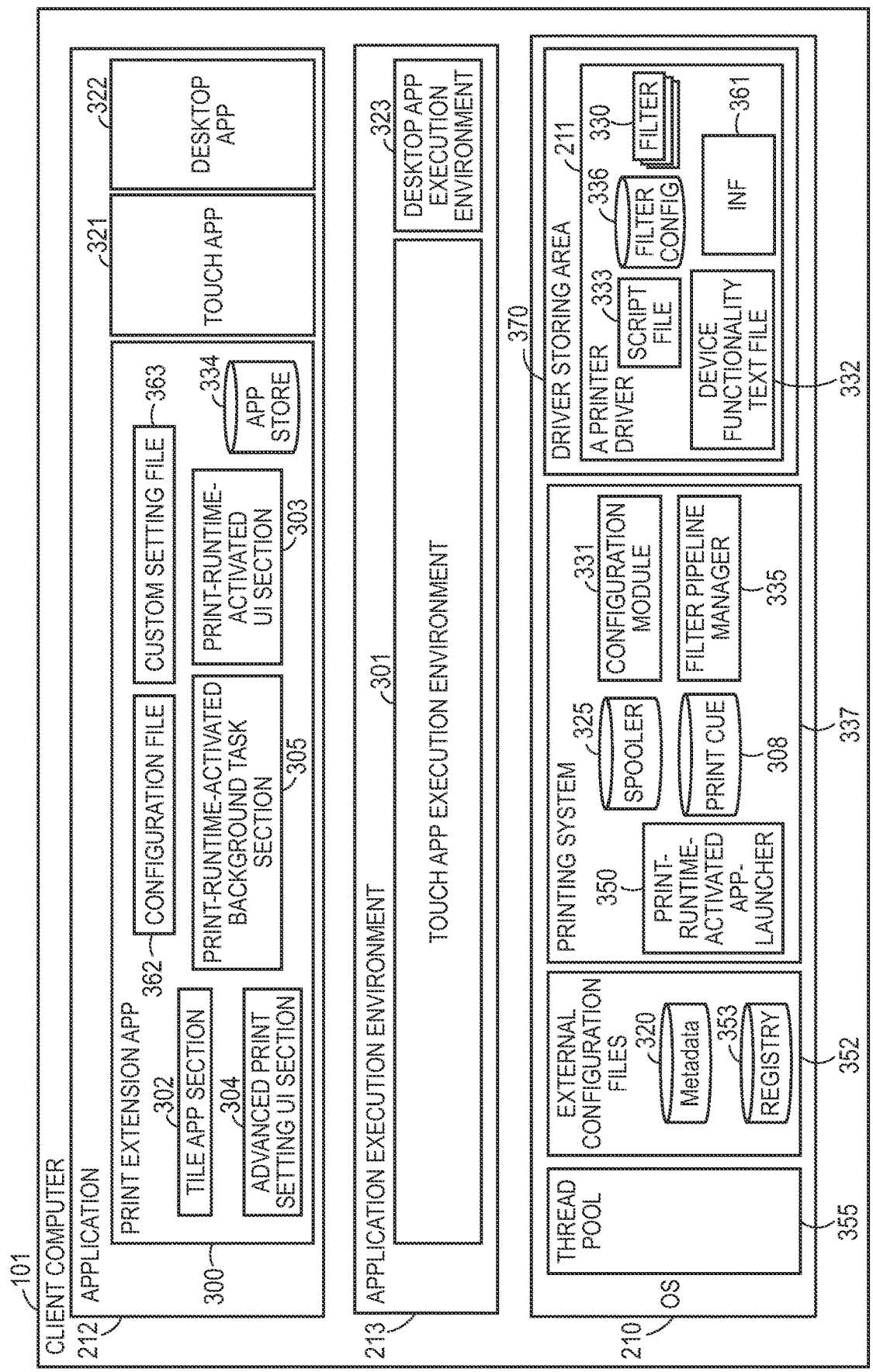
FIG. 3 is a software block diagram of a client computer of the embodiment.

FIG. 3 illustrates an example of a software configuration of the client computer 101. The software configuration in FIG. 3 is implemented by the CPU 201 in the client computer 101 loading a program stored in the external memory 209 or the like onto RAM 202 and executing the program.

As illustrated in FIG. 3, software in the client computer 101 has three layers: the OS 210, the application execution environment 213, and the application 212.

First, each element included in the OS 210 will be described.

The OS 210 includes a printing system 337, a printer driver 211, external configuration files 352, and a thread pool 355.

The external configuration files 352 will then be described.

The external configuration files 352 include metadata 320 and a registry 353.

The metadata 320 is definition information including both a print extension app identifier of a print extension app 300 and an HWID (HardwareId) of the print cue 308 of a printer driver offered by a printer vendor and is responsible for associating both with each other. The print extension app 300 is an extension program for supplementing functions of the printer driver offered by a printer vendor and is an application specialized for each vendor, each printer type, or the like.

It should be noted that the metadata 320 cannot associate a printer driver with a plurality of print extension apps 300. Since the OS common printer driver is available to a plurality of printers for printing, the OS common printer driver may be required to be associated with a plurality of print extension apps 300. However, in an approach using the metadata 320, the OS common printer driver cannot be associated with a plurality of print extension apps 300. In the embodiment, an approach of using the registry 353 to associate the OS common printer driver with a plurality of print extension apps 300 will be described, although details will be described later.

The registry 353 is an area in which settings for the OS 210 are written. In the registry 353, values can be written in a key and value manner, and settings on a print cue basis or the like can be written. With the registry 353, a setting of a policy indicative of whether activation of a background task by a print-runtime-activated app-launcher 350 is to be enabled or disabled, an identifier of a print extension app 300 related to a printer driver, and the like are registered. Details will be described later with reference to FIG. 12. The settings registered with the registry 353 can be changed through a setting screen of the OS 210.

Elements making up the printing system 337 will then be described.

The print cue 308 is an area for temporarily saving a print job when printing is to be executed by using a printer in the network 103, and there may be a plurality of print cues 308.

In an example illustrated in FIG. 12 described later, it is assumed that print cues 308 corresponding to MFP 501 and MFP 502 illustrated in FIG. 4 described later are created.

A spooler 325 is a module for temporarily saving and managing an XPS (XML Paper Specification) file that includes data to be printed, the data being printed from any of applications 212. The XPS file saved in the spooler 325 is converted to PDL (Page Description Language) through a filter pipeline manager 335 and then transmitted to a printer through the spooler 325.

The filter pipeline manager 335 is a module that loads one or more filters 330 for converting an XPS file into a PDL file. The filter pipeline manager 335 is formed as part of the printing architecture (also referred to as "printing system") provided by the OS 210. The OS 210 reads one or more filters 330, which is one of elements making up the printer driver 211, based on definition in a filter config 336 and uses the one or more filters to generate PDL. For the PDL, PCL (Printer Controll Language), PS (Post Script), PDF (Portable Document Format) and the like can be adopted.

A configuration module 331 is a module for generating and modifying PrintTicket. The configuration module 331 has a prohibition function of placing a restriction such that non-combinable settings cannot be made. The configuration module 331 also manages capability information of a printer, or PrintCapabilities.

An advanced print setting UI section 304, a print-runtime-activated background task section 305, and a print-runtime-activated UI section 303 of the print extension app 300 described later can call APIs provided by the configuration module 331. These sections can call the APIs to obtain PrintTicket or PrintCapabilities of an XML (Extensible Markup Language) type.

As the printer driver 211, the V4 printer driver provides a device functionality text file 332, in which a prohibition rule or a device functionality is written, or a script file 333 to the OS 210. The operation of the configuration module 331 is customized based on the device functionality text file 332 and the script file 333.

The print-runtime-activated app-launcher 350 is a module for controlling execution of background tasks provided by the print-runtime-activated background task section 305 or the like. The print-runtime-activated app-launcher 350 activates the print-runtime-activated background task section 305 when the OS 210 senses that a print start instruction is input by a user to execute printing. In the case in which a setting to disable activation of background tasks is stored in the registry 353, the OS 210 prevents the background tasks from being executed.

The printer driver 211 is made up of a filter 330, a filter config 336, a script file 333, a device functionality text file 332, an INF 361, and the like and is saved in a driver storing area 370. In the embodiment, it is assumed in the description that an OS common printer driver 500 that supports printers from a plurality of vendors is installed as the printer driver. The OS common printer driver 500 may be a class driver incorporated as a standard function of the OS 210 or may be a universal printer driver that can be separately installed on the computer 100 by a user.

The filter 330 is called by the filter pipeline manager 335 and has a function for converting an input XPS file into PDL for output.

The filter config 336 is a definition file referenced by the filter pipeline manager 335, and the order of one or more filters 330 to be called is written in the filter config 336.

The script file 333 and the device functionality text file 332 are called by the configuration module 331 and allow the operation of the configuration module 331 to be customized.

INF 361 is a text file in which setting information for installing the printer driver 211 is written.

The thread pool 355 is a module for storing threads for use in executing various applications 212 or modules in the OS 210.

The application execution environment 213 is made up of a desktop app execution environment 323 and a touch app execution environment 301.

The touch app execution environment 301 is an execution environment for executing a touch app 321 or a print extension app 300, which are each one of the applications 212 described later and are operated on the OS 210.

The touch app execution environment 301 is an execution environment for operating a UWP application (UWP Device Apps) distributed from the server 104 and controls execution of the UWP application. The print extension app 300 also supports UWP Device Apps.

The desktop app execution environment 323 is an execution environment for executing a desktop app 322, which is one of the applications 212 described later. The desktop app execution environment 323 controls execution of "Win 32/64 applications" or ".NET applications", for example.

The applications 212 are made up of three types of application: for example, the touch app 321, the print extension app 300, and the desktop app 322. The touch app 321 is an application operated in the touch app execution environment 301. The touch app 321 is downloaded through an application distribution system that is open to public on the Internet and installed on the client computer 101. In the touch app 321, necessary modules are packaged and signed, and stricter restriction is placed on invocation of API in the OS 210 than the desktop app 322.

The print extension app 300 is a type of touch app 321 and is operated in the touch app execution environment 301 similarly to the touch app 321. The print extension app 300 can be obtained through the Internet from the application distribution system. The print extension app 300 has a print-runtime UI display function for displaying a uniquely-customized UI during printing. The print extension app 300 can be related to a printer driver offered by a printer vendor through metadata 320. When the print extension app 300 is related to the OS common printer driver 500, the print extension app 300 is to be associated with the OS common printer driver 500 by using the INF 361 or the registry 353. Details will be described later with reference to FIG. 4.

The print extension app 300 includes a tile app section 302, the advanced print setting UI section 304, the print-runtime-activated background task section 305, and the print-runtime-activated UI section 303.

The tile app section 302 is a UI section that is to be executed upon acceptance of a user operation for activating the print extension app 300 and provides functions such as status display of a registered printer.

The advanced print setting UI section 304 is a UI section that is to be executed upon receipt of an advanced print setting event issued by the OS 210. The advanced print setting UI section 304 generates and displays a UI for print setting based on PrintTicket and PrintCapabilities obtained through an API from the configuration module 331. The advanced print setting UI section 304 modifies a setting of PrintTicket as necessary according to a user operation and returns the setting to the configuration module 331.

The print-runtime-activated background task section 305 is a component corresponding to a background task to be executed when a print event is issued.

The print-runtime-activated background task section 305 can obtain and read/write PrintTicket through an API for the configuration module 331. It is specified that, when the WF function is used, a background task should determine whether or not the print-runtime-activated UI section 303 is to be activated and request the OS 210 to activate the print-runtime-activated UI section 303, which is a foreground task component, as necessary. In this way, for example, a password input screen for authentication print (FIG. 8B or the like as described later) is displayed.

The print-runtime-activated background task section 305 can read/write a modified value from/to an app store 334 to pass/receive the modified value to/from the print-runtime-activated UI section 303. When it is determined that the print-runtime-activated UI section 303 is not be displayed, the print-runtime-activated app-launcher 350 generates print data without activating the print extension app 300.

The print-runtime-activated UI section 303 activated by the background task can edit the XPS or PrintTicket serving as data to be printed and return the data to the OS 210.

Upon request for activation being made to the OS 210 by the background task, the OS 210 activates the print-runtime-activated UI section 303. In addition to obtaining PrintTicket or PrintCapabilities and modifying the settings, the print-runtime-activated UI section 303 can obtain an XPS file of data to be printed. To modify the XPS file, it is necessary to pass an edited XPS file to the print-runtime-activated background task section 305 through the app store 334 and then return the edited XPS file to the OS 210 by the print-runtime-activated background task section 305. In the embodiment, the print-runtime-activated UI section 303 displays UIs, such as a UI for confirmation on printing and a UI for prompting a user to input a setting still to be input (for example, a password input screen in FIG. 8B or the like as described later).

A configuration file 362 is a file in which set values for the print extension app 300 are written. In the file, a print extension app identifier that uniquely indicates the print extension app 300 and a custom setting file to be used are written.

A custom setting file 363 is a configuration file in which settings for services available to a printer driver are written by the print extension app 300.

A relation between the OS common printer driver and the print extension app 300 will then be described. FIG. 4 illustrates an example of a relation between a printer, the OS common printer driver 500, and the print extension app 300.

FIG. 5 is a flow chart illustrating an example of a process of associating the OS common printer driver 500 with the print extension app 300. Processes in FIG. 5, and FIG. 6, FIG. 7A, FIG. 7B, FIG. 14A, and FIG. 14B that are described later are implemented by the CPU 201 loading programs stored in the external memory 209 or the like onto RAM 202 and executing the programs, the programs being for implementing each of modules, components, and applications. Description of control provided by each of modules, components, and applications will be made with each of the sections implemented by the CPU 201 as the subject of the sentence.

Further, some of the processes such as display, acceptance of a user operation, and data transmission/reception processes are cooperatively implemented by the CPU 201, I/Fs, and input/output devices connected to the I/Fs.

Figure 4:
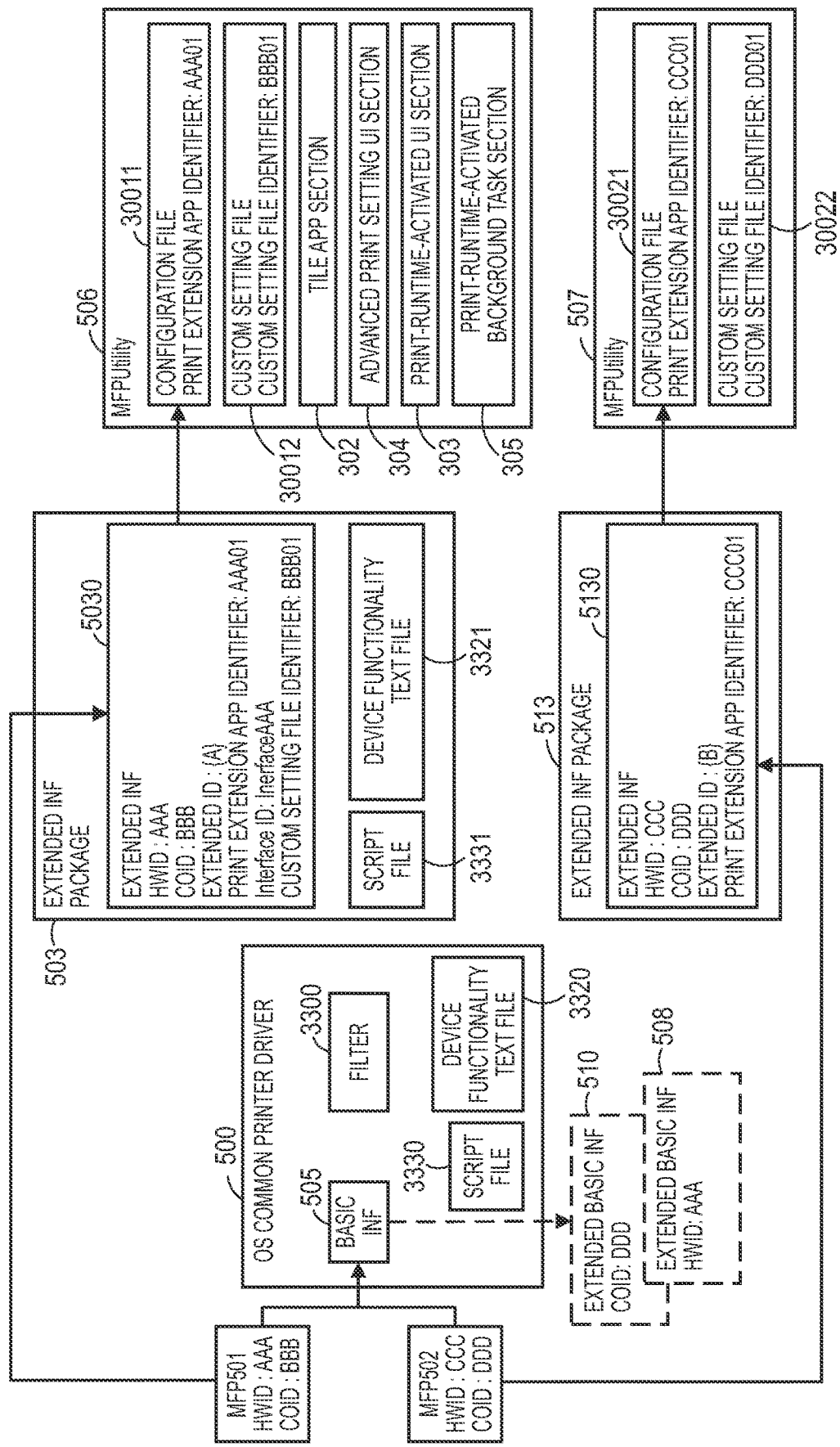
FIG. 4 illustrates a relation between an OS common printer driver and a print extension app.

In FIG. 4, MFP 501 (corresponding, for example, to the printer 102) and MFP 502 (corresponding, for example, to the printer 105) have an HWID and a COID (Compatible ID) each serving as identification information that enables the type of device to be identified.

The OS common printer driver 500 has a basic driver INF 505 in which a filter 3300 and the like relating to basic functions for printing are written. The PDL generated by the OS common printer driver 500 is not limited to PCL and PS and may be of any type, such as PDF and PWG Raster, provided that the language is standardized. In the embodiment, the OS common printer driver 500 and the printing system 337 can cooperate to generate a print job according to a predetermined print protocol and transmit the print job to each printer. For example, the predetermined print protocol is IPP (Internet Printing Protocol) or the like.

For example, when "Add printer" illustrated in FIG. 9B described later is pressed, the OS 210 starts a process in the flow chart in FIG. 5 (S500). Here, although adding a printer to be used with the OS common printer driver 500 from a print setting screen is illustrated as an example, the disclosure is not limited thereto. For example, a printer to be used with the OS common printer driver can be added from a control screen for managing a printer provided by the OS 210.

The OS 210 multicasts in the network 103 to make an inquiry and waits for a response from a print-enabled printer (S501). In the embodiment, it is assumed that the MFP 501 and the MFP 502 have responded.

The OS 210 receives responses from the printers in the network 103 and displays a UI such as a list (S502). In the embodiment, although the case in which a search process is executed when a key 924 is pressed is illustrated, the disclosure is not limited thereto. For example, in response to display of a screen for selecting a printer to which data is output prior to printing, both a set-up printer and a printer that has been found by the searching but is still to be set up may be listed. In this case, such a set-up printer and a printer still to be set up may be displayed in a distinguishable manner. After the printers are displayed, the OS 210 accepts a user operation (S503).

After accepting the user operation, the OS 210 installs the OS common printer driver 500 such that the printer designated by the user operation is ready for printing and sets a port to the registry 353 (S504). For illustration, it is here assumed that the user operation to designate the MFP 501 is accepted in S503. In this case, in the installation process in S504, a driver storing area 5001 illustrated in FIG. 13, which corresponds to the printer selected in S503, is secured in the external memory 209. Then, the filter config 336, the filter 3300, the basic INF 505, a script file 3330, a device functionality text file 3320 of the OS common printer driver 500 are copied into the driver storing area 5001.

After installing the OS common printer driver 500, the OS 210 makes a request again to the MFP 501 to obtain device information including the HWID or the COID of the MFP 501 (S505).

Further, the OS 210 dynamically generates an extended basic INF 508 in which the HWID or the COID obtained in S506 is written and applies the extended basic INF 508 to the OS common printer driver 500 by overwriting and extending the basic INF 505. The extended basic INF is created for each printer. Apart from the HWID and the COID, the OS 210 may generate setting information for the OS common printer driver 500 during installation based on information obtained from the device and write the setting information in the extended basic INF 508.

Further, the OS 210 writes the content of the extended basic INF 508 created in S506 to the registry 353 (S507).

The OS 210 then checks whether an extended INF package including the HWID or the COID obtained in S506 is present in an external server (for example, a server managed by a provider of the OS 210: for example, the server 104 in FIG. 1) (S508). When it is determined that the corresponding extended INF package is not present in the external server (No in S508), the OS 210 ends the processes of the flow chart (S512).

Figure 13:
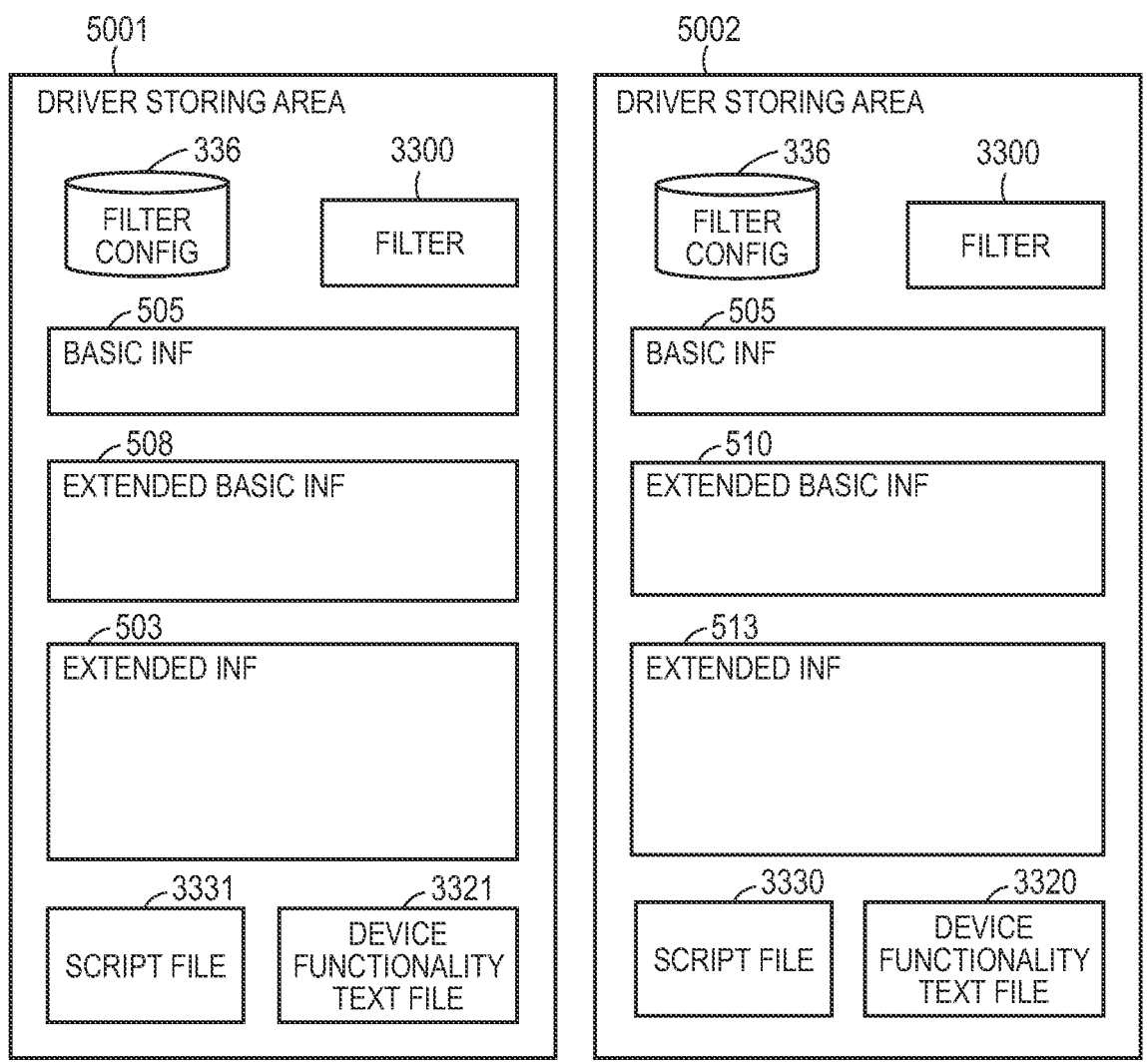
FIG. 13 illustrates a configuration of the case in which an OS common printer driver is installed for a plurality of printers in the first embodiment.

On the other hand, in S508, when it is determined that the extended INF package including the HWID or the COID obtained in S506 is present in the external server (Yes in S508), the OS 210 continues the process with S509. In S509, the OS 210 obtains an extended INF package 503 and applies the extended INF package 503 to the OS common printer driver 500 by overwriting and extending the driver storing area 5001 (FIG. 13).

The extended INF package 503 includes an extended INF 5030, a script file 3331, and a device functionality text file 3321. In the extended INF 5030, setting information during installation is written such as the HWID, the COID, an extended ID, a print extension app ID, an InterfaceID, a custom setting file identifier, and destinations for installing the script file 3331 and the device functionality text file 3321. The extended ID represents an identifier of the extended INF. The InterfaceID represents an Interface accessible to the print extension app 300. The custom setting file identifier represents an identifier that allows a custom setting file contained in the print extension app 300 to be identified.

Here in the example, the script file 3331 or the device functionality text file 3321, which is unique to a printer vendor, is installed in S509.

In the script file 3331, a printer vendor-specific prohibition logic is written, and in the device functionality text file 3321, printer 102-specific capability information or prohibition information is written. The OS common printer driver 500 uses the script file 3331 or the device functionality text file 3321 in the extended INF package 503 to overwrite and extend the script file 3330 or the device functionality text file 3320 in the driver storing area 5001.

Further, the extended INF package 503 contains the extended INF 5030, and the OS 210 applies the extended INF 5030 by overwriting and extending the basic driver INF 505 and the extended basic INF 508. The process in S509 makes the vendor-specific prohibition logic or the like available to the OS common printer driver 500.

The OS 210 then checks whether the print extension app identifier is present in the extended INF 5030 and whether or not a print extension app 300 matching the identifier is present in the external server (S510). In other words, the OS 210 checks whether or not MFPUtility 506 including a configuration file 30011 in which the print extension app identifier written in the extended INF 5030 is written.

When it is determined that the print extension app identifier is not present in the extended INF 5030 or that a print extension app 300 matching the identifier is not present in the external server (No in S510), the OS 210 ends the processes of the flow chart (S512).

On the other hand, when it is determined that the print extension app identifier is present in the extended INF 5030 and that a print extension app 300 matching the identifier is present in the external server (Yes in S510), the OS 210 continues the process with S511.

In S511, the OS 210 downloads the print extension app (for example, the MFPUtility 506) in the extended INF 5030 matching the print extension app identifier from the external server and installs the print extension app on the OS 210. Then, the processes of the flow chart end (S512). In the embodiment, although the case in which the print extension app is automatically installed is illustrated, the disclosure is not limited thereto. For example, when determination is Yes in S510, it may be possible to ask a user whether the print extension app should be installed.

In the processes described above, the OS common printer driver 500 and the print extension app corresponding to the MFP 501 can be associated with each other. Although the MFP 501 has been illustrated in the above example, it is possible to install the OS common printer driver 500 for another printer, such as MFP 502, while the extended basic INF 508, the extended INF package 503, and the MFPUtility 506 for the MFP 501 are present.

In this case, another extended basic INF, extended INF, and print extension app can be separately managed and installed on the OS 210 (for example, as in a driver storing area S002 in FIG. 13). FIG. 4 also illustrates the OS common printer driver 500, the MFP 502, an extended basic INF 510, an extended INF package 513 are associated with the print extension app for the MFP 502. In this way, the OS common printer driver can be associated with a plurality of print extension apps.

With reference to FIG. 13, a configuration of the case in which an OS common printer driver is installed for a plurality of printers.

FIG. 13 illustrates an example of a configuration of the case in which an OS common printer driver is installed for a plurality of printers in the first embodiment. Here, installation of a common printer driver that outputs print jobs to the MFP 501 and the MFP 502 illustrated In FIG. 4 will be described.

First, consider that the OS common printer driver 500 is to be installed for the MFP 501. At this time, the filter config 336, the filter 3300, the basic INF 505, the script file 3330, and the device functionality text file 3320 are copied into the driver storing area 5001. The extended basic INF 508 is also generated.

Next, the extended INF 5030, the script file 3331, and the device functionality text file 3321 as described above are downloaded from the external server and saved in the driver storing area 5001. At this time, the script file 3330 and the device functionality text file 3320 are replaced with the script file 3331 and the device functionality text file 3321. In the example in FIG. 13, although the files are replaced, all the script file 3330 and the device functionality text file 3320 may be saved without replacement by extending with the script file 3331 and the device functionality text file 3321.

The contents of the basic INF 505, the extended basic INF 508, and the extended INF 5030 are written in the registry 353 as information for making an association with the printer driver, the print cue, and the print extension app 300. This will be described later with reference to FIG. 12.

Next, consider that the OS common printer driver 500 is to be installed for the MFP 502. At this time, the filter config 336, the filter 3300, the basic INF 505, the script file 3330, and the device functionality text file 3320 are copied into the driver storing area S002 different from the driver storing area 5001. The extended basic INF 510 is also generated. Since no script file or device functionality text file exists in the extended INF package 513, only the script file 3330 and the device functionality text file 3320 of the OS common printer driver 500 are saved. The driver storing area 5001 and the driver storing area S002 may be of one folder or may be of a plurality of folders.

FIG. 12 illustrates an example of written items in the registry 353 in the first embodiment.

The registry 353 is created for each print cue 308. An item 1201 is a cue name attribute and the name of the print cue 308 is written under the item. An item 1202 indicates an HWID column in which an HWID of the printer 102 is written. An item 1203 indicates an AppID column. In the AppID column, a print extension app identifier of the print extension app 300 related to the print cue 308 is written.

An item 1204 indicates a policy column in which whether the corresponding print extension app for each print cue 308 is to be activated can be set. An item 1205 indicates an InterfaceID column in which an ID is written, the ID uniquely indicating Interface callable by the print extension app 300 associated with the print cue 308 written in the extended INF.

An item 1206 indicates a custom setting file identifier column. In the custom setting file identifier column 1206, the custom setting file identifier written in the extended INF is written. An item 1207 indicates a driver column. In the driver column 1207, the driver storing area is written. According to a value in the driver column 1207, files in the driver storing area are associated with settings of each print cue 308. An item 1208 indicates a port column in which port information of a print destination for the print cue 308 is written.

FIG. 11 illustrates an example of PrintCapabilities generated based on the device functionality text file 332 stored in the printer driver to be used for printing.

As illustrated in FIG. 13, the device functionality text file can possibly be replaced with the device functionality text file in the extended INF package. Upon replacement, PrintCapabilities are created from the replaced device functionality text file.

In PrintCapabilities, there is a plurality of Options in one Feature. The Feature represents a function that can be set.

The Option in the Feature represents a choice. In information 1101 in FIG. 11, a Feature and Options for authentication print (secure print) are illustrated. In this example, it is defined that two choices for the Feature of JobSecurePrint: "ns0000:SecurePrint" and "ns0000:None" can be selected.

With reference to FIG. 10, PrintTicket in which an authentication print is set will be described.

FIG. 10 illustrates an example of PrintTicket in which an authentication print is set.

In PrintTicket, any of set values defined in PrintCapabilities is stored as current print settings. Information 1001 indicates that an authentication print function, which requires an input of a personal identification number at the time of printing, is set. In this example, the fact that the Option contained in the Feature of JobSecurePrint is set to "ns0000:SecurePrint" indicates the authentication print is "on". When the authentication print is not "on", the Option is set to "ns0000:None".

An element in "psf:ParameterInit" in information 1002 indicates a value of a text input. In the example in FIG. 10, a password "XXXXXX" for the authentication print is set through the print setting screen. In the case in which a password is not set through the print setting screen, the configuration module 331 generates PrintTicket that does not include the element in "psf:ParameterInit".

Subsequently, a printing operation by using the printer 102 will be described with reference to FIG. 9A, FIG. 9B, and FIG. 9C.

Figure 9A:
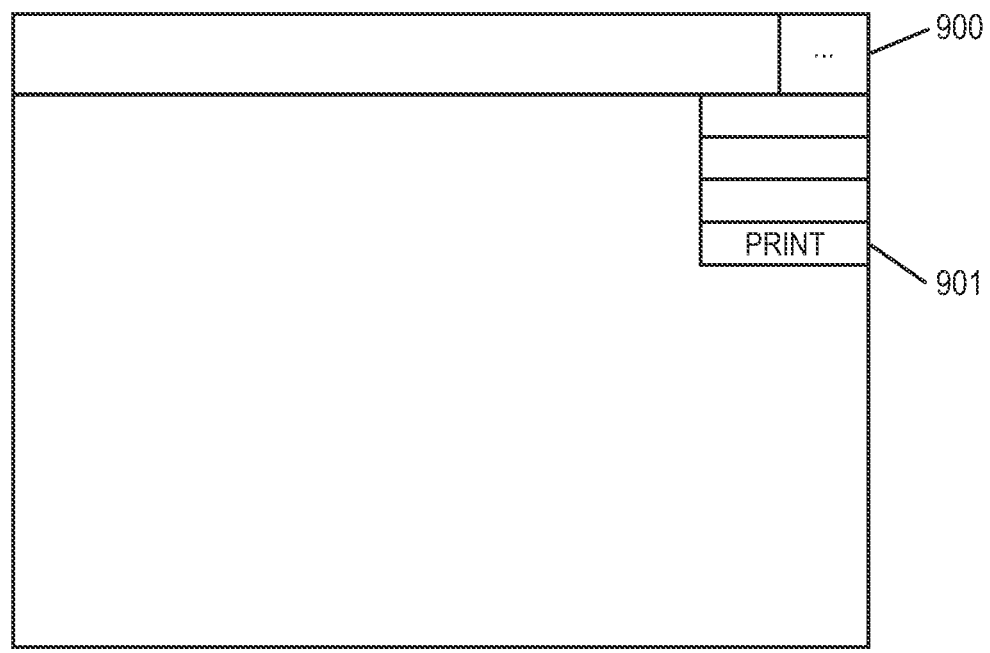
FIG. 9A is a view for illustrating a screen for executing printing.
Figure 9B:
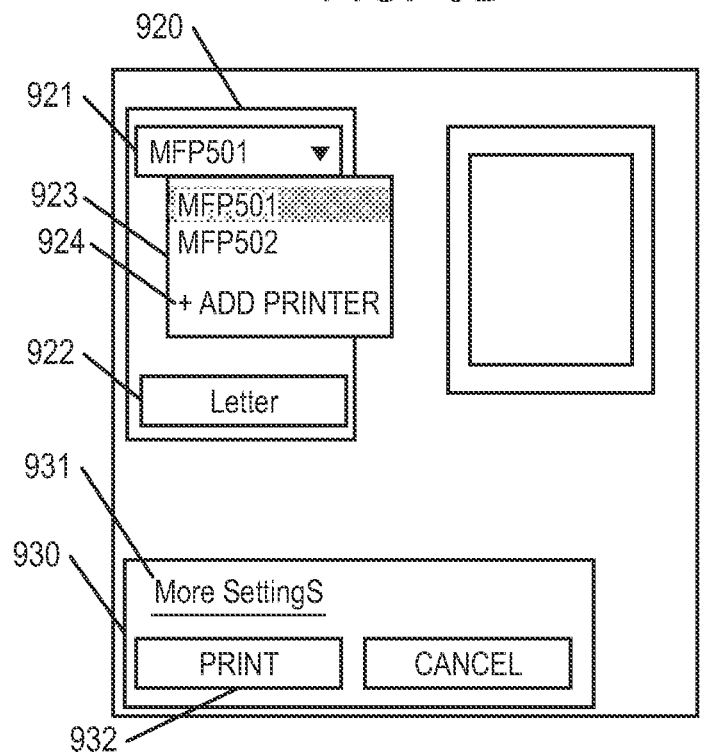
FIG. 9B is a view for illustrating a screen for executing printing.
Figure 9C:
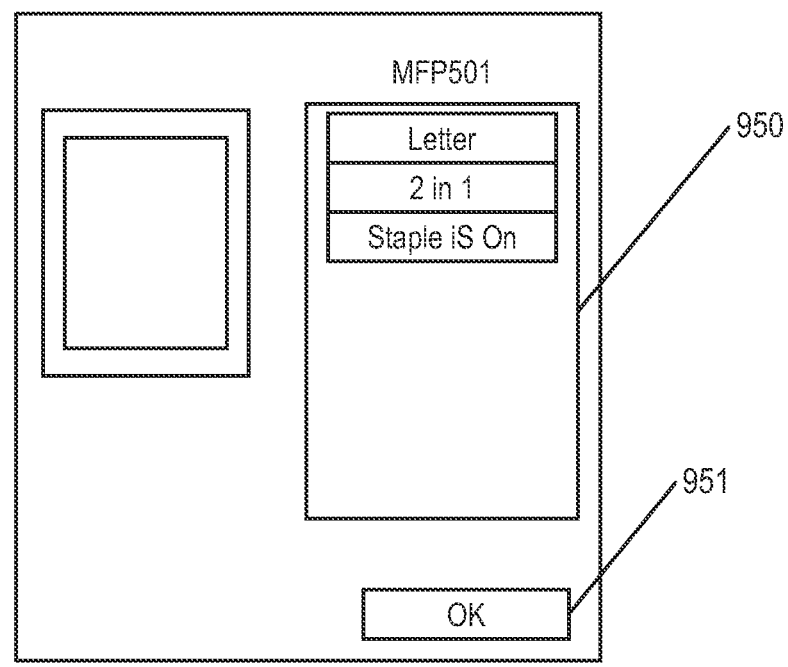
FIG. 9C is a view for illustrating a screen for executing printing.

FIG. 9A, FIG. 9B, and FIG. 9C are views for illustrating a printing operation by using the MFP 501.

In the embodiment, although the case in which printing is executed from a UWP app, or the touch app 321, is illustrated, the disclosure is not limited thereto. The printing can be executed from the desktop app 322.

FIG. 9A is an example of a screen displayed on the display 207 by the touch app 321. The touch app 321 has an area for displaying a content. A menu key 900 is a key for displaying a menu. Here, the menu is displayed. A plurality of choices is displayed on the menu, and a user can select a print key 901 from the menu.

Upon sensing the print key 901 being selected, the touch app 321 requests the OS 210 to display a print dialog.

FIG. 9B illustrates an example of a print dialog displayed by the OS 210.

The print dialog is a dialog displayed by the OS 210 for making a simple print setting. The print dialog includes an item 920 for print setting and an item 930 related to a print instruction. A user can select the item 920 to make a simple print setting.

The OS 210 obtains PrintTicket set for the print cue 308 corresponding to a printer set as a regularly used printer from the configuration module 331 for display on the print dialog.

In an item 921, the name of a selected print cue is displayed. A user can select one printer in a printer list 923 to change the printer for use. When an intended printer for printing is not displayed, "Add printer" in an item 924 can be pressed for instruction to multicast in the network 103 to transmit a request and search for the printer.

After the searching, a list of printers available for printing is displayed, and then a user can make a selection to install either the OS common printer driver or a printer driver offered by a printer vender. As described above, both a display item for selecting an installed printer and another display item for selecting a printer that has been found by the searching but the setup is still to be completed may be displayed in the printer list 923.

An item 922 is an example of a print setting made by the simple print setting, and a user can select the item 922 to change the size of sheet used in printing.

An item 931 is a display item used for calling the advanced print setting UI section 304 provided by the print extension app 300. An advanced print setting event occurs upon clicking on the item 931 by a use, and the print dialog as illustrated in FIG. 9C is displayed by the advanced print setting UI section 304. Hereinafter, it is assumed in the description that the printer driver refers to the OS common printer driver 500 and the print extension app refers to the MFPUtility 506.

An item 932 is a display item used to start printing based on a content provided by the touch app 321.

Upon sensing the item 932 displayed as a print dialog being pressed, the OS 210 generates a print event. After the print event is generated, the touch app 321 cooperates with the OS 210 to generate an XPS file based on the content to be printed (also referred to as a print content) and proceeds to print processes illustrated in the flow chart in FIG. 6. A specific controlling method in the print processes will be described later with reference to flow charts in FIG. 6 and FIGS. 7A and 7B.

FIG. 9C illustrates an example of an advanced print setting screen displayed by the advanced print setting UI section 304.

An item 950 is an advanced print setting section and is generated based on PrintCapabilities and PrintTicket obtained from the OS common printer driver 500. The print settings are changed by accepting a user operation and are confirmed when a print confirmation button illustrated in an item 951 is pressed. Once confirmed, the screen transitions to the print dialog in FIG. 9B.

Figure 14A:
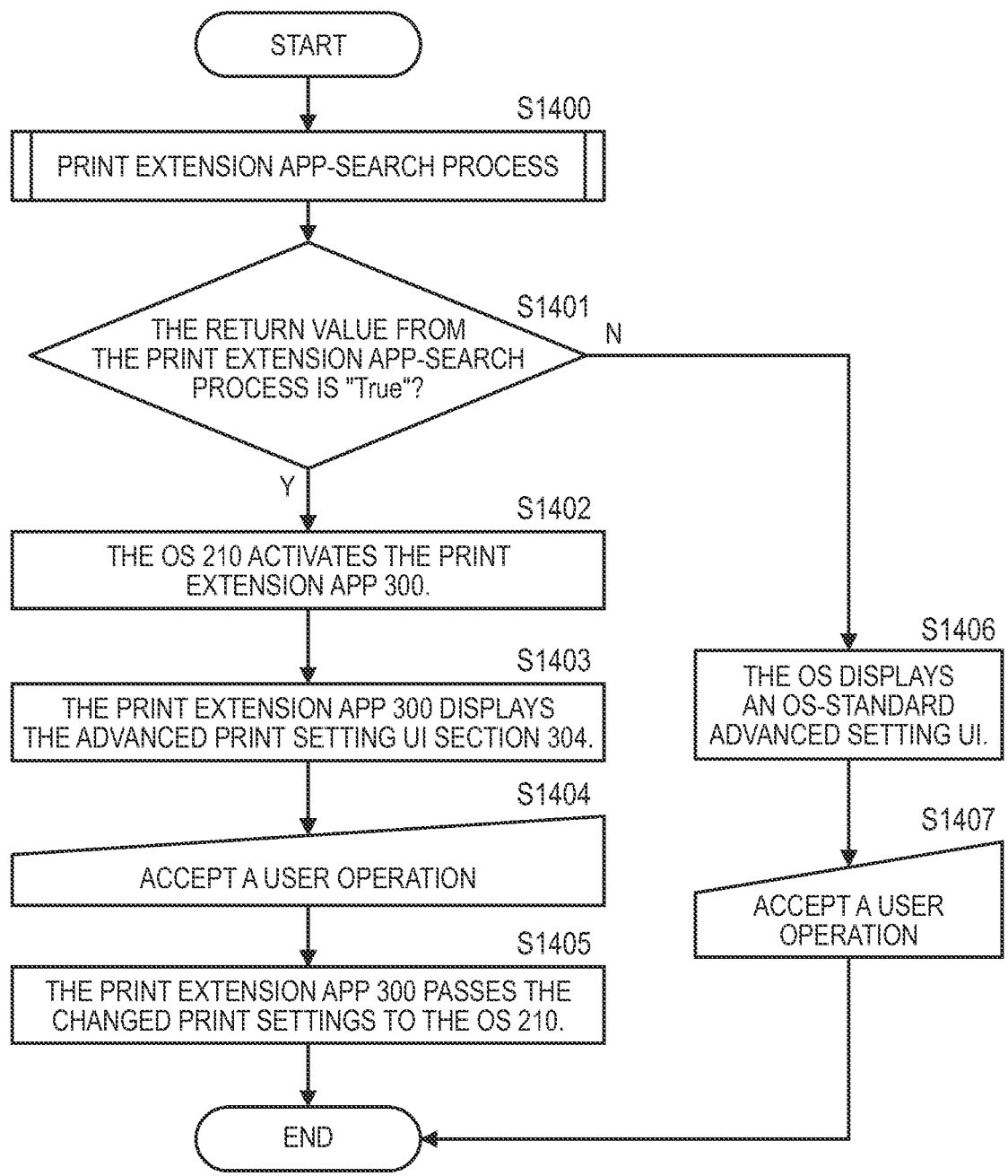
FIG. 14A is a flow chart of a process of displaying an advanced print setting UI section.

FIG. 14A and FIG. 14B are flow charts illustrating an example of a process of displaying an advanced print setting UI section upon the advanced print setting event.

In S1400 in FIG. 14A, the OS 210 executes a print extension app-search process. Details of the print extension app-search process will be described with reference to FIG. 14B.

In S1411 in FIG. 14B, the OS 210 reads information in the registry 353 of the print cue 308 selected by a user.

Then, the OS 210 checks whether a value (print extension app identifier) is written in the AppID column of the item 1203 of the registry read in S1411. When it is determined that the print extension app identifier is not written (No in S1412), then the OS 210 determines that no print extension app associated with the selected print cue exists and continues the process with S1416.

In S1416, the OS 210 returns "False" to the originating process.

On the other hand, when it is determined that the print extension app identifier is written (Yes in S1412), the OS 210 continues the process with S1413.

In S1413, the OS 210 searches all save locations in which touch apps 321 are installed in the OS 210 for a print extension app matching the print extension app identifier.

Then, the OS 210 determines whether or not a print extension app matching the print extension app identifier is present (S1414). When it is determined that any print extension app matching the print extension app identifier is not present (No in S1414), then the OS 210 determines that no print extension app 300 associated with the print cue exists and continues the process with S1416.

On the other hand, when it is determined that the print extension app matching the print extension app identifier is present (Yes in S1414), the OS 210 determines that there is a print extension app 300 associated with the print cue and continues the process with S1415.

In S1415, the OS 210 returns "True" and information for identifying the print extension app to be activated (for example, AppID) to the originating process.

In this way, the print extension app-search process (S1400) ends. Now, return to the description of FIG. 14A.

In S1401, the OS 210 determines whether or not the return value from the print extension app-search process is "True". When it is determined that the return value is "True" (Yes in S1401), the OS 210 continues the process with S1402.

In S1402, the OS 210 activates the print extension app 300 based on the information for identifying the print extension app to be activated. In the embodiment, although AppID is illustrated as an example of information for identifying the print extension app to be activated, the disclosure is not limited thereto. For example, the information for the identification may be a file path indicating a location where the print extension app is stored.

In S1403, from the OS 210, the print extension app 300 receives PrintTicket and PrintCapabilities generated from the script file 333 and the device functionality text file 332 and displays the advanced print setting UI section 304. At this time, the OS 210 obtains a save location of the script file 333 and the device functionality text file 332 by referencing the registry 353. The OS 210 then obtains the script file 333 and the device functionality text file 332 corresponding to the print cue 308.

Then, in S1404, the print extension app 300 accepts changes in print settings through a user operation.

Then, in S1405, the print extension app 300 passes the changes in print settings through a user operation to the OS 210, and the processes of the flow chart end. In the process from S1402 to S1405, a user interface for print setting on the print extension app 300 offered by a vendor can be displayed to allow PrintTicket to be edited even when the OS common printer driver 500 is used. For example, vendors can implement flexible user interfaces as the print extension app 300. Accordingly, for example, vendors can offer user interfaces that have operational feel similar to a V3 or V4 printer driver traditionally offered by the vendors even for users who use the OS common printer driver.

On the other hand, in S1401, when it is determined that the return value is not "True" (the return value is "False") (No in S1401), the OS 210 continues the process with S1406.

In S1406, the OS 210 displays an OS-standard advanced setting UI. OS-standard advanced settings only allow simpler settings at most independent of printer vendors in nature compared to the print extension app 300. Print settings displayed in S1406 are displayed based on PrintCapabilities, which is generated based on information on capabilities (attribute information) of a printer obtained based on the feature of a predetermined print protocol (for example, IPP) supported by the common printer driver 500, and PrintTicket, which indicates current print settings.

Here, the case in which the common printer driver 500 is an IPP-compatible printer driver is detailed as an example. In this case, operations of requesting printer attributes as defined in RFC2911 (Get-Printer-Attributes Operations) are used to obtain standard capabilities of a printer.

Specifically, in the installation process described with reference to FIG. 5, the common printer driver 500 transmits Get-Printer-Attributes Request to a printer selected by a user. Subsequently, the common printer driver 500 obtains attribute information indicating capabilities of the printer as defined in IPP as a response to the request, converts the obtained attribute information file into the device functionality text file, and stores the file in the driver storing area 5001. As described with reference to FIG. 10 and FIG. 11, PrintTicket and PrintCapabilities are generated by the printing system 337 based on the device functionality text file.

Then, in S1407, the OS 210 accepts the changes in print settings through a user operation, and the processes of the flow chart end.

FIG. 6 is a flow chart illustrating an example of a process executed in response to a print event. An application causing a print event may be the touch app 321 or the desktop app 322. The processes of the flow chart start with the OS 210 transferring an XPS file to the spooler 325, the XPS file being generated by the OS 210 cooperating with the application 212 causing the print event. Once the transfer of the XPS file is completed, the processes of the flow chart start.

In S601, the OS 210 executes the print extension app-search process as described with reference to FIG. 14B.

Then, in S610, the OS 210 determines whether or not the return value from the print extension app-search process is "True". When it is determined that the return value is not "True" (the return value is "False") (No in S610), the OS 210 continues the process with S603.

On the other hand, when it is determined that the return value is "True" (Yes in S610), the OS 210 continues the process with S602.

In S602, the OS 210 executes a print-runtime app-activation process (activation process for a WF function). Details of the process will be described later with reference to FIGS. 7A and 7B.

When a series of processes related to the print-runtime app-activation process (activation process for a WF function) is completed, the OS 210 continues the process with S603.

In S603, the filter pipeline manager 335 of the OS 210 obtains PrintTicket and the XPS file from the spooler 325.

In S604, the filter pipeline manager 335 reads the filter 330 corresponding to the printer driver 211 to be used for printing based on definitions in the filter config 336 from the external memory 209 and load the filter onto the RAM 202.

Then, in S605, the filter pipeline manager 335 inputs the XPS file to the filter loaded in S604 and causes the filter to execute conversion. The conversion may be executed by using a plurality of filters. The filter pipeline manager 335 transfers a resultant PDL from the conversion to the spooler 325, and the processes of the flow chart end.

After the PDL is transferred, the spooler 325 cooperates with the network I/F 214 to transmit a print job including the converted PDL and PrintTicket to the printer 102. The printer 102, when received the print job transmitted through a series of processes, executes print processes based on the print job.

Subsequently, with reference to FIGS. 7A and 7B, the activation process for a WF function executed in S602 will be described in detail.

Figure 7A:
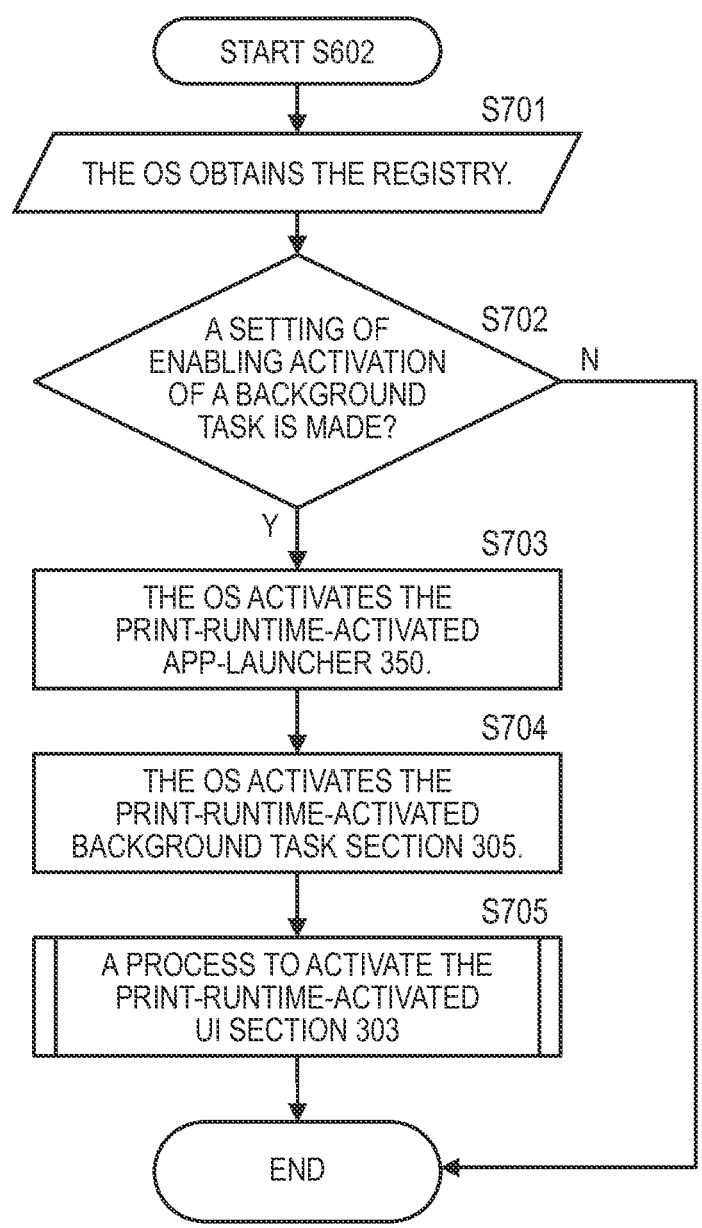
FIG. 7A is a flow chart of a print-runtime app-activation process (activation process for a WF function).

FIG. 7A and FIG. 7B are flow charts illustrating an example of a print-runtime app-activation process (activation process for a WF function).

In S701, the OS 210 reads settings in the policy column (item 1204) of the registry 353 corresponding to a selected cue.

Then, in S702, the OS 210 determines whether or not a setting of enabling activation of a background task (ON) is stored in the policy column of the registry 353. When it is determined that the setting of enabling activation of a background task (ON) is not stored (a setting of disabling activation (OFF) is stored) in the policy column of the registry 353 (No in S702), the OS 210 ends the processes of the flow chart. In other words, a series of activation processes for the WF function is skipped, and the process proceeds to S603 in FIG. 6 or later.

On the other hand, when it is determined that the setting of enabling activation of a background task (ON) is stored in the policy column of the registry 353 (Yes in S702), the OS 210 continues the process with S703.

In S703, the OS 210 activates the print-runtime-activated app-launcher 350.

In S704, the print-runtime-activated app-launcher 350 requests the OS 210 to activate the print-runtime-activated background task section 305, which is a component of the print extension app 300. Specifically, the print-runtime-activated app-launcher 350 identifies the print extension app to be activated based on the information for identifying the print extension app to be activated (AppID).

Subsequently, the print-runtime-activated app-launcher 350 cooperates with the touch app execution environment 301 to perform operation so as to activate a component for executing a background task of the identified print extension app. In the embodiment, a component of the print-runtime-activated background task section 305 of the print extension app 300 is activated.

In S705, the print-runtime-activated background task section 305 requests the OS 210 to activate a component of the print-runtime-activated UI section 303, which is a foreground task.

The OS 210, when received the request, assigns the print-runtime-activated UI section 303 provided by the print extension app 300 as a thread in the thread pool 355 and causes the display 207 to transition into a state in which a screen can be displayed by the print-runtime-activated UI section 303. The print-runtime-activated UI section 303 obtains a delayed object for continuing interaction with a user. Hereinafter, the process for the print-runtime-activated UI section 303 will be illustrated in FIG. 7B.

Figure 8A:
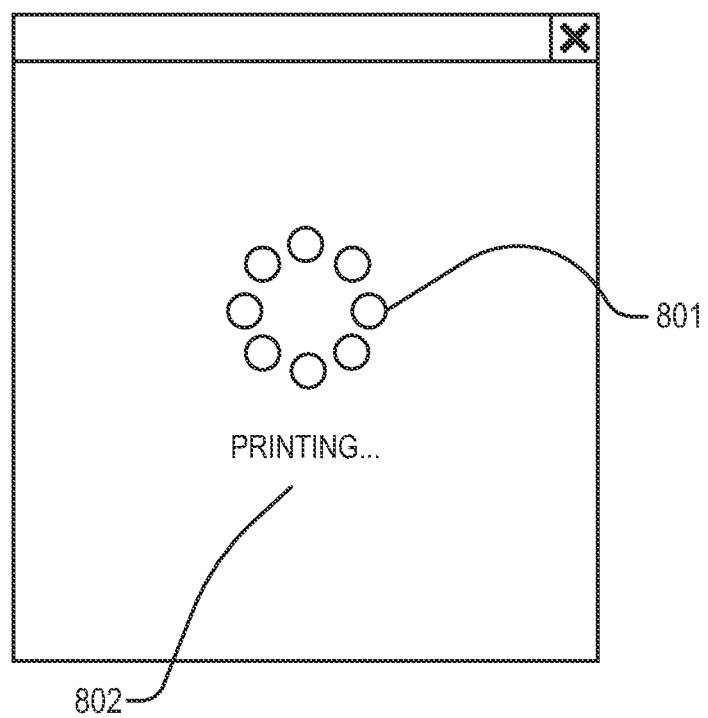
FIG. 8A illustrates an example of a screen displayed by a print-runtime-activated UI section.

In S706, the print-runtime-activated UI section 303 displays a progress screen as illustrated in FIG. 8A on the display 207.

Figure 8B:
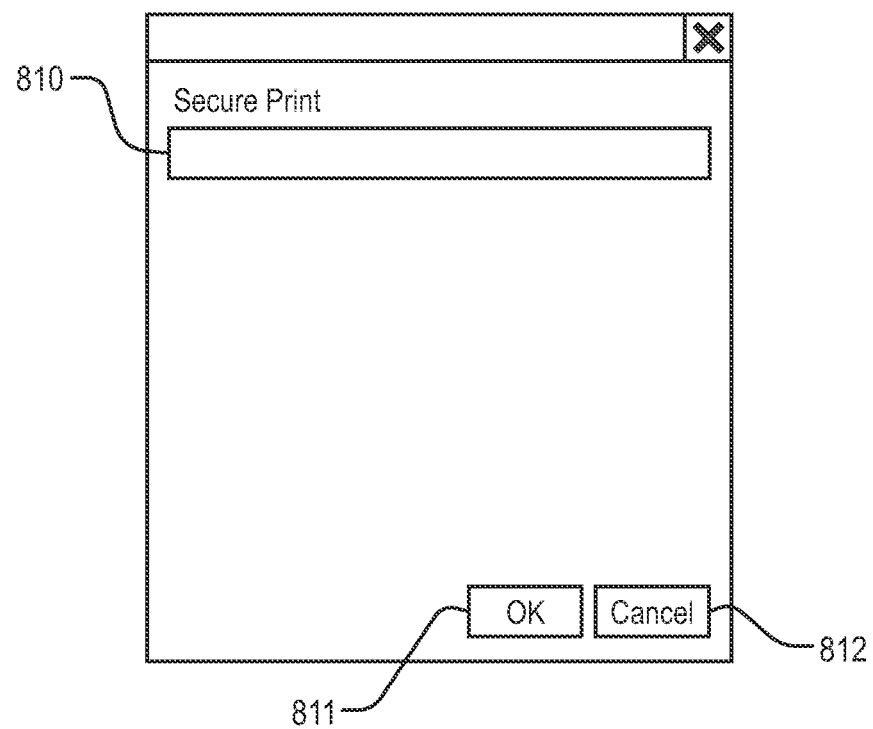
FIG. 8B illustrates an example of a screen displayed by a print-runtime-activated UI section.

FIG. 8A and FIG. 8B illustrate examples of screens displayed by the print-runtime-activated UI section 303 on the display 207, and FIG. 8A illustrates an example of a progress screen.

As illustrated in FIG. 8A, a progress ring indicated as 801 is displayed on the progress screen. The print-runtime-activated UI section 303 displays a motion such as a continuously turning progress ring 801 to indicate to a user that the process is in execution. The print-runtime-activated UI section 303 also displays a character string such as "printing . . . " indicated as 802 to indicate to the user that the process related to printing is in execution.

Now, return to the description of FIGS. 7A and 7B.

In S707, the print-runtime-activated UI section 303 requests the OS 210 to activate an analysis thread, which is asynchronously executed from the UIthread. The OS 210 assigns the analysis thread in the thread pool 355. The analysis thread obtains PrintTicket from the configuration module 331 and attempts analyzing the obtained PrintTicket. In the embodiment, although the case in which an analysis process and a UI control process are controlled on separate threads, the disclosure is not limited thereto.

In S708, the print-runtime-activated UI section 303 determines whether or not the authentication print (secure print) is set in PrintTicket based on a result of the attempt of analysis of PrintTicket in S707. When it is determined that the authentication print is not set (No in S708), then the print-runtime-activated UI section 303 continues the process with S711.

On the other hand, when it is determined that the authentication print is set (Yes in S708), then the print-runtime-activated UI section 303 continues the process with S709.

In S709, UIthread of the print-runtime-activated UI section 303 switches the screen displayed on the display 207 to the input screen as illustrated in FIG. 8B.

FIG. 8B illustrates an example of the input screen.

In FIG. 8B, an area 810 illustrates a text box for inputting authentication information. The user inputs a password, a PIN cord, or the like in the area 810. A button 811 is an OK button, which is a key for confirming the authentication information input in the area 810 upon accepting an operation event such as a click. The OK button 811 may be grayed out until the authentication information is input in the area 810.

A cancel button 812 is a key used to cancel printing. When the cancel key 812 is pressed, execution of a print job is terminated.

Now, return to the description of FIGS. 7A and 7B.

In S710, UIthread of the print-runtime-activated UI section 303 accepts a user operation and changes settings of PrintTicket based on the user operation. Specifically, the information 1002 illustrated in FIG. 10 is rewritten based on the input authentication information. When there is no attribute corresponding to the information 1002, such an attribute is added to PrintTicket.

The print-runtime-activated UI section 303 calls a method for releasing the delayed object in order to notify the OS 210 of completion of interaction with a user. Once the delayed object is released and an ending process of the foreground task, the main entity of processing transitions to a background task.

Subsequently, in S711, the print-runtime-activated UI section 303 passes PrintTicket with the settings changed and an XPS file to the background task section 305. The background task section 305, when received PrintTicket and the XPS file, transmits the PrintTicket and the XPS file to the filter pipeline manager 335 and ends a series of processes related to the WF function.

When it is determined that the background task is not to be activated in S702 in FIG. 7A, PrintTicket obtained from the module 331 and an XPS file generated in response to a print instruction are transmitted to the filter pipeline manager 335.

As described above, in response to the print-runtime-activated background task section 305 making up the background task being called by the OS, the print-runtime-activated UI section 303, which is the foreground task, can be called to display a UI.

Accordingly, after the print-runtime-activated UI section 303, which is the foreground task, receives the delayed object, the print-runtime-activated UI section 303 can be caused to analyze PrintTicket.

In this way, it is possible to prevent the print processes from being terminated due to incompletion of a process executed by the background task. Further, after the print-runtime-activated UI section 303 is called, a UI such as a progress ring is displayed to indicate in-processing.

Accordingly, the user can be comprehensibly notified of a process being executed. In FIGS. 7A and 7B and FIG. 8B, although inputting a password for the authentication print (secure print) is illustrated as an example of a user interface provided by the print extension app 300 after printing, the disclosure is not limited thereto. For example, the print-runtime-activated UI section 303 of the print extension app 300 can provide a print preview before output and the like.

Second Embodiment

In the first embodiment described above, some driver components overlap because same driver components are installed in two driver storing areas as illustrated in FIG. 13. In the second embodiment, a configuration in which driver components are installed in the driver storing area excluding overlapping components will be described. The same configuration as that of the first embodiment will have the same reference numeral and the description will be omitted.

Figure 15:
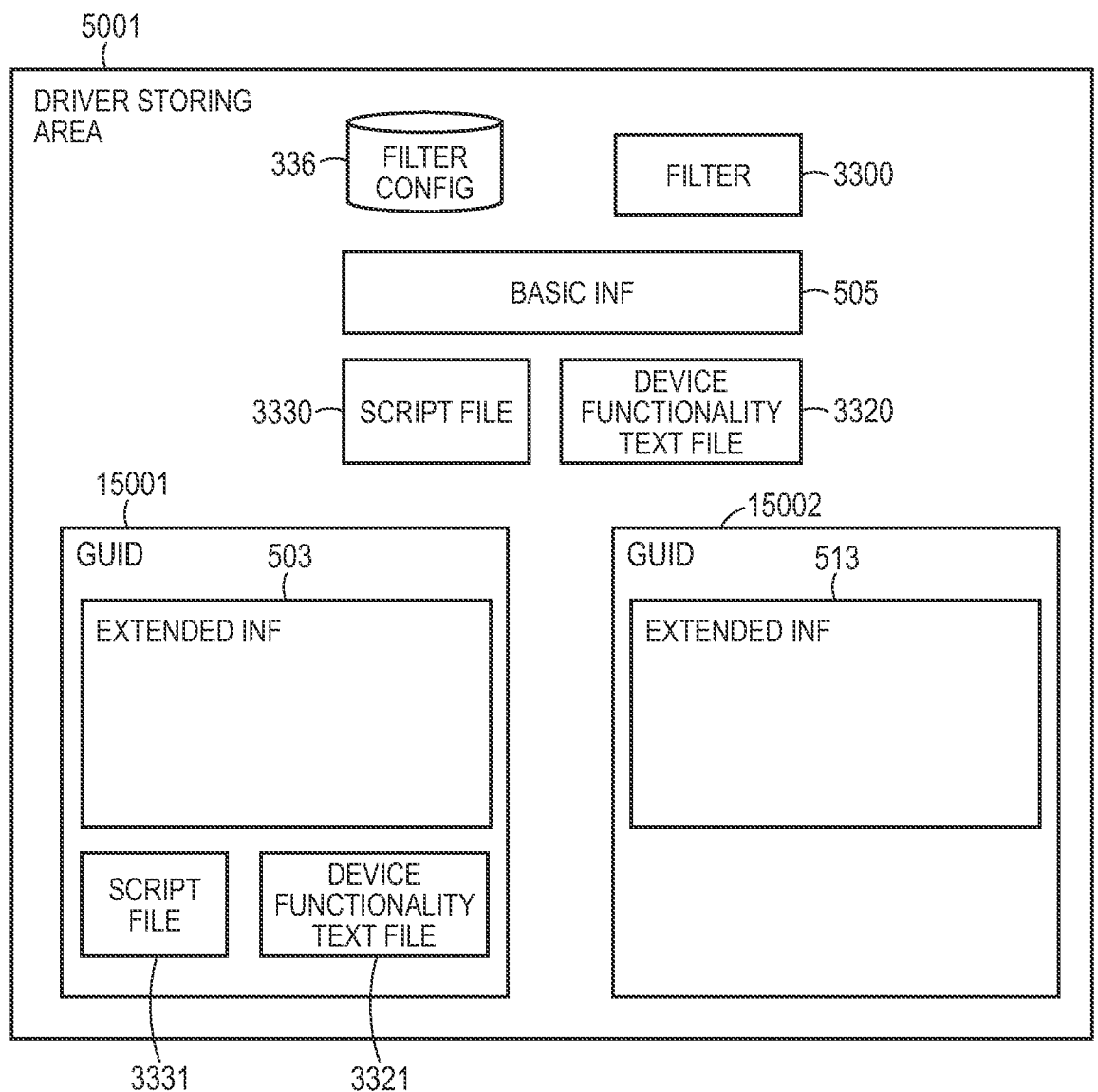
FIG. 15 illustrates a configuration of the case in which an OS common printer driver is installed for a plurality of printers in a second embodiment.

FIG. 15 illustrates an example of a configuration of the case in which an OS common printer driver is installed for a plurality of printers in the second embodiment. Here, installation of one printer driver associated with the MFP 501 and the MFP 502 illustrated in FIG. 4 will be described.

The driver storing area 5001 includes the filter config 336, the filter 3300, the basic INF 505, the script file 3330, the device functionality text file 3320.

An item 15001 is a saving area (folder) for containing extension files for the MFP 501. In the folder, a folder name is generated based on GUID (Globally Unique Identifier), and the extended INF 503, the script file 3331, and the device functionality text file 3321 are saved in the folder.

An item 15002 is a saving area (folder) for containing extension files for the MFP 502. In the folder, a folder name is also generated based on GUID similarly to the folder of the item 15001. Since there are no script file or device functionality text files for the MFP 502, these files are not created in the folder. When there is no extension file for the MFP 502, the folder itself is not created.

FIG. 16 illustrates an example of written items in the registry 353 in the second embodiment, and the same item as that of the first embodiment has the same reference numeral.

An item 16001 is an extension file save location. The extension file save location 16001 indicates a save location for an extension file used by a print cue, such as the item 15001 and the item 15002 as described with reference to FIG. 15. As necessary, the OS 210 uses information in the save location written in the extension file save location 16001 to obtain necessary information for generation or prohibition of PrintTicket and PrintCapabilities.

According to the second embodiment, with the configuration described above, installation can be achieved without overlapped components of the same driver in the driver storing area. Further, installation can be achieved while components of one common printer driver 500 are associated with two or more different printers.

In the embodiments described above, although configurations in which a printer is connected to the client computer 101 through a network, the present disclosure is also applicable to a configuration in which a printer is connected to the client computer 101 through an interface such as USB. In this case, the search process of S501 in FIG. 5 is also executed including a search for a printer connected through an interface such as USB.

According to the embodiments described above, printer-dependent extension applications such as UWP Device Apps (print extension app) can suitably be associated with the OS common printer driver of the V4 driver type. Accordingly, printers offered by various vendors, including the printer's specific functions, can be controlled through a common printer driver with high customizability.

Further, when an extension application that corresponds to a printer selected by a user is not installed or when an extension application is not used as indicated by a set policy, print settings can be achieved based on an OS-standard setting UI provided by the OS 210. Accordingly, even when a printer that does not provide an extension application is selected, a print setting UI according to the capability of the printer obtained based on a predetermined print protocol (for example, IPP) supported by the common printer driver can be displayed.

Configurations of various data and the contents described above are not limited thereto and any other configurations and contents may be used depending on the application or purpose.

For example, in the embodiments, although the case in which information for identifying an extension application or a printer to which data is output is stored in the registry 352, and the OS 210 references the registry 352 to determine an extension application to be activated is illustrated, the disclosure is not limited thereto.

For example, association information in FIG. 12 or FIG. 15 may be stored in a storage area accessible to the printing system 337, the printer driver 211, or the like. In this case, as a main entity, the printing system 337 of the OS 210 uses a common framework of the OS of API to cause the extension application to be activated.

In this case, it is not necessary to write information to a registry database, which can possibly affect the entire system. Accordingly, this has an effect of enhancing user experience related to printing while minimizing an effect on the system. Although embodiments have been illustrated, embodiments of the present invention can be implemented in the form of system, apparatus, method, program, storage media, and the like. Specifically, the present disclosure may be applicable to a system made up of plural pieces of equipment or to an apparatus made up of a single piece of equipment.

Further, some embodiments of the present invention encompass a combined configuration of embodiments described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, printer-dependent extension programs can suitably be associated with a common printer driver. Accordingly, the convenience can be enhanced when a common printer driver is used.

What is claimed is:

1. A method for controlling an information processing apparatus, the method comprising:
   searching for printers;
   storing an identifier of a first printer selected from among the printers detected by the search in association with a printer driver and an identifier of a first print setting application;
   storing an identifier of a second printer selected from among the printers detected by the search in association with the printer driver and an identification information of a second print setting application, wherein the identification of the first printer has been stored in association with the printer driver;
   transmitting, to the first printer, print data that has been generated by the printer driver based on print setting values set via a first print setting screen provided by the first print setting application; and transmitting, to the second printer, print data that has been generated by the printer driver based on print setting values set via a second print setting screen provided by the second print setting application.

2. The method according to claim 1, wherein the first print setting application is an application provided by a printer vendor of the first printer.

3. The method according to claim 1, wherein the first print setting application causes the information processing apparatus to display the object based on information obtained from an external server.

4. The method for according to claim 1, wherein the first print setting application causes the information processing apparatus to display the object based on a user instruction received via a predetermined object provided by an operating system of the information processing apparatus.

5. The method for according to claim 1, wherein the printer driver is provided as a standard function of an operating system of the information processing apparatus.

6. The method for according to claim 1, wherein the printer driver generates print data a format of which is a predetermined format and which is transmitted according to the Internet Printing Protocol.

7. The method for according to claim 6, wherein the predetermined format is PDF or PWG-Raster.

8. The method according to claim 1, wherein the identifier of the first printer is obtained from the first printer, the identifier of the second printer is obtained from the second printer, the identifier of the first print setting application and the identifier of the second print setting application are obtained from an external apparatus.

9. The method according to claim 8, wherein the first print setting screen is provided based on capability of the first printer obtained from the external apparatus.

10. A non-transitory storage medium having stored thereon a program for causing, when executed by an information processing apparatus, a controller of the information processing apparatus including a processor to perform:

searching for printers;

storing an identifier of a first printer selected from among the printers detected by the search in association with a printer driver and an identifier of a first print setting application;

storing an identifier of a second printer selected from among the printers detected by the search in association with the printer driver and an identification information of a second print setting application, wherein the identification of the first printer has been stored in association with the printer driver;

transmitting, to the first printer, print data that has been generated by the printer driver based on print setting values set via a first print setting screen provided by the first print setting application; and transmitting, to the second printer, print data that has been generated by the printer driver based on print setting values set via a second print setting screen provided by the second print setting application.

11. The non-transitory storage medium according to claim 10, wherein the first print setting application is an application provided by a printer vendors of the first printer.

12. The non-transitory storage medium according to claim 10, wherein the first print setting application causes the information processing apparatus to display the object based on information obtained from an external server.

13. The non-transitory storage medium according to claim 10, wherein the first print setting application causes the information processing apparatus to display the object based on a user instruction received via a predetermined object provided by an operating system of the information processing apparatus.

14. The non-transitory storage medium according to claim 10, wherein the printer driver is provided as a standard function of an operating system of the information processing apparatus.

15. The non-transitory storage medium according to claim 10, wherein the printer driver generates print data a format of which is a predetermined format and which is transmitted according to the Internet Printing Protocol.

16. The non-transitory storage medium according to claim 15, wherein the predetermined format is PDF or PWG-Raster.

17. An information processing apparatus comprising:

a controller configured to:

search for printers;

store an identifier of a first printer selected from among the printers detected by the search in association with a printer driver and an identifier of a first print setting application;

store an identifier of a second printer selected from among the printers detected by the search in association with the printer driver and an identification information of a second print setting application, wherein the identification of the first printer has been stored in association with the printer driver;

transmit, to the first printer, print data that has been generated by the printer driver based on print setting values set via a first print setting screen provided by the first print setting application; and transmit, to the second printer, print data that has been generated by the printer driver based on print setting values set via a second print setting screen provided by the second print setting application.

18. The information processing apparatus according to claim 17, wherein the first print setting application is an application provided by a printer vendor of the first printer.

19. The information processing apparatus according to claim 17, wherein the first print setting application causes the information processing apparatus to display the object based on information obtained from an external server.

20. The information processing apparatus according to claim 17, wherein the first print setting application causes the information processing apparatus to display the object based on a user instruction received via a predetermined object provided by an operating system of the information processing apparatus.

21. The information processing apparatus according to claim 17, wherein the printer driver is provided as a standard function of an operating system of the information processing apparatus.

22. The information processing apparatus according to claim 17, wherein the printer driver generates print data a format of which is a predetermined format and which is transmitted according to the Internet Printing Protocol.

23. The information processing apparatus according to claim 22, wherein the predetermined format is PDF or PWG-Raster.

* * * * *